US012075751B2

(12) United States Patent
Paxson et al.

(10) Patent No.: US 12,075,751 B2
(45) Date of Patent: Sep. 3, 2024

(54) PET KENNEL AND METHOD OF CONSTRUCTION

(71) Applicant: Doskocil Manufacturing Company, Inc., Arlington, TX (US)

(72) Inventors: Ryan Paxson, Elk Rapids, MI (US); David Veness, Fort Worth, TX (US); Michael Harper, Fort Worth, TX (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 243 days.

(21) Appl. No.: 17/242,642

(22) Filed: Apr. 28, 2021

(65) Prior Publication Data

US 2021/0329881 A1 Oct. 28, 2021

Related U.S. Application Data

(60) Provisional application No. 63/016,393, filed on Apr. 28, 2020.

(51) Int. Cl.
*A01K 1/02* (2006.01)
(52) U.S. Cl.
CPC .................. *A01K 1/0245* (2013.01)
(58) Field of Classification Search
CPC .. A01K 1/0245; A01K 1/0236; A01K 1/0254; A01K 1/0272; A01K 1/0281; A01K 1/029; A01K 1/03; E05B 17/22; E05B 55/00; E05B 57/00
See application file for complete search history.

(56) References Cited

U.S. PATENT DOCUMENTS

| | | | | |
|---|---|---|---|---|
| 1,001,217 A | * | 8/1911 | Nitzsche | E05B 55/00 70/404 |
| 1,272,417 A | * | 7/1918 | Gee | E05B 55/00 70/150 |
| 2,435,634 A | * | 2/1948 | Nicolin | E05B 55/00 70/129 |
| 3,791,347 A | * | 2/1974 | Lovell | A01K 1/03 119/497 |
| 6,182,611 B1 | * | 2/2001 | Marchioro | A01K 1/0245 D30/114 |
| 6,523,499 B1 | * | 2/2003 | Chrisco | A01K 1/0245 119/496 |
| 6,783,162 B1 | * | 8/2004 | Harper | A01K 1/0245 292/336.3 |
| 7,261,060 B1 | * | 8/2007 | Garofola | A01K 1/0236 119/482 |
| 8,413,472 B2 | * | 4/2013 | Chiang | E05G 1/026 119/497 |

(Continued)

*Primary Examiner* — Tien Q Dinh
*Assistant Examiner* — Katelyn T Truong
(74) *Attorney, Agent, or Firm* — GLOBAL IP COUNSELORS, LLP

(57) ABSTRACT

A pet kennel and method of construction is disclosed herein. In an embodiment, the pet kennel includes a body and a door assembly. The body has an interior space configured for a pet and includes at least one aperture sized and shaped for the pet. The door assembly is attached to the body at the aperture. The door assembly includes a latching part pivotally attached to a hinge part. The latching part includes a latching mechanism configured to lock and unlock the door assembly. The hinge part is fixedly attached to the body so as to substantially surround a perimeter of the aperture.

20 Claims, 23 Drawing Sheets

(56) References Cited

U.S. PATENT DOCUMENTS

| | | | | |
|---|---|---|---|---|
| 9,943,063 B1* | 4/2018 | Volin | ...................... | A01K 1/034 |
| 2005/0087996 A1* | 4/2005 | Jackson | .................... | E05C 3/06 |
| | | | | 292/336.3 |
| 2008/0245313 A1* | 10/2008 | Jakubowski | ......... | A01K 1/0245 |
| | | | | 119/497 |
| 2013/0106122 A1* | 5/2013 | Do | ......................... | B64D 29/06 |
| | | | | 292/228 |
| 2016/0024824 A1* | 1/2016 | Link | ....................... | E05C 3/12 |
| | | | | 119/481 |
| 2016/0227731 A1* | 8/2016 | Cheng | .................... | E05B 63/14 |
| 2018/0106076 A1* | 4/2018 | Liang | .................... | E05B 63/14 |
| 2018/0288964 A1* | 10/2018 | Tamiozzo | ............ | A01K 1/0245 |
| 2019/0320613 A1* | 10/2019 | Björnetun | ............ | A01K 1/0272 |
| 2021/0108454 A1* | 4/2021 | Boyer | ..................... | E05B 17/22 |

* cited by examiner

PET KENNEL AND METHOD OF CONSTRUCTION

PRIORITY

This patent application claims priority to U.S. Provisional Patent Application No. 63/016,393, filed Apr. 28, 2020 and entitled "Premium Kennel," the entire contents of which is incorporated herein by reference and relied upon.

BACKGROUND

Field of the Invention

The present disclosure relates to a pet kennel and its method of construction. In particular, the present disclosure relates to a pet kennel with improved strength in comparison to prior art pet kennels.

Background of the Invention

Various conventional pet kennels exist. Conventional pet kennels can include doors that are susceptible to failure or gaps, for example, when a user or pet pushes or pulls against the door. Conventional pet kennels can also be susceptible to failure at seams where various parts are attached.

SUMMARY

The present disclosure provides durable pet kennel which protects against failure, for example at the door and seams, while maximizing the interior space available for a pet. In view of the state of the known technology, one aspect of the present disclosure is to provide a pet kennel including a body and a door assembly. The body has an interior space configured for a pet and includes at least one aperture sized and shaped for the pet. The door assembly is attached to the body at the aperture. The door assembly includes a latching part pivotally attached to a hinge part. The latching part includes a latching mechanism configured to lock and unlock the door assembly. The hinge part is fixedly attached to the body so as to substantially surround a perimeter of the aperture.

In accordance with a second aspect of the present disclosure, which can be combined with any other aspect described herein, the hinge part includes metal, and the latching part includes plastic.

In accordance with a third aspect of the present disclosure, which can be combined with any other aspect described herein, the door assembly includes an inner body part fixedly attached to the hinge part and the body such that the body is located between the hinge part and the inner body part.

In accordance with a fourth aspect of the present disclosure, which can be combined with any other aspect described herein, the door assembly includes a grated part and a grate receiving part. The latching part is fixedly attached to the grated part and the grate receiving part such that the latching part, the grated part and the grate receiving part pivot as one piece with respect to the hinge part.

In accordance with a fifth aspect of the present disclosure, which can be combined with any other aspect described herein, the latching mechanism includes a latch slide and a rack lock, the latch slide rotatable to cause the rack lock to lock and unlock the door assembly.

In accordance with a sixth aspect of the present disclosure, which can be combined with any other aspect described herein, the latch slide includes a gear which cooperates with teeth on the rack lock to cause the rack lock to slide laterally to lock and unlock the door assembly.

In accordance with a seventh aspect of the present disclosure, which can be combined with any other aspect described herein, the latching mechanism includes a biasing mechanism configured to bias the latch slide against the rack lock.

In accordance with an eighth aspect of the present disclosure, which can be combined with any other aspect described herein, the door assembly includes a latch receiving portion having a recess configured to receive the latch slide, the latch slide unlocking the door assembly when pulled out of the recess.

In accordance with a ninth aspect of the present disclosure, which can be combined with any other aspect described herein, the latch receiving portion includes a lateral protrusion extending outwardly from the recess, the rack lock including an aperture sized and shaped to be placed over the lateral protrusion.

In accordance with a tenth aspect of the present disclosure, which can be combined with any other aspect described herein, the body includes a first body portion and a second body portion. The first body portion includes a first lip. The second body portion includes a second lip sized and shaped to align with the first lip for attachment of the first body portion to the second body portion.

In accordance with an eleventh aspect of the present disclosure, which can be combined with any other aspect described herein, a method of constructing a pet kennel includes providing a body having an interior space configured for a pet such that the body includes an aperture sized and shaped for the pet, providing a door assembly including a latching part, a hinge part and a latching mechanism, and attaching the door assembly to the body such that the hinge part substantially surrounds a perimeter of the aperture and the latching part pivots with respect to the hinge part when the latching mechanism is unlocked.

In accordance with a twelfth aspect of the present disclosure, which can be combined with any other aspect described herein, providing the door assembly includes fixedly attaching the latching part to a grated part, and pivotally attaching the latching part and the grated part to the hinge part.

In accordance with a thirteenth aspect of the present disclosure, which can be combined with any other aspect described herein, attaching the door assembly to the aperture of body includes attaching the hinge part of the door assembly outside of the body at the aperture, and attaching an inner body part of the door assembly inside of the body at the aperture.

In accordance with a fourteenth aspect of the present disclosure, which can be combined with any other aspect described herein, providing the door assembly includes forming the latching mechanism to include a latch slide and a rack lock, such that when the door assembly is attached to the body the latch slide is rotatable to cause the rack lock to lock and unlock the door assembly.

In accordance with a fifteenth aspect of the present disclosure, which can be combined with any other aspect described herein, providing the body includes attaching a first body portion to a second body portion to create the interior space.

In accordance with a sixteenth aspect of the present disclosure, which can be combined with any other aspect described herein, attaching the first body portion to the second body portion includes aligning a first lip of the first body portion with a second lip of the second body portion.

In accordance with a seventeenth aspect of the present disclosure, which can be combined with any other aspect described herein, a pet kennel comprises a first body portion, a second body portion, and at least one attachment mechanism. The first body portion includes a first lip having first apertures. The second body portion is configured to attach to the first body portion to form an interior space therebetween. The second body portion includes a second lip having second apertures. The second lip is sized and shaped to fit against the first lip with the second apertures aligning with the first apertures. The at least one attachment mechanism is configured to protrude through at least one first aperture and at least one corresponding second aperture to attach the first lip to the second lip such that an interior space sized and shaped for a pet is formed between the first body portion and the second body portion.

In accordance with an eighteenth aspect of the present disclosure, which can be combined with any other aspect described herein, the first body portion and the second body portion attach to form a body having a top surface, a bottom surface, a front surface and a rear surface, the first lip and the second lip angled downwardly from the rear surface to the front surface.

In accordance with a nineteenth aspect of the present disclosure, which can be combined with any other aspect described herein, the pet kennel comprises a sleeve including third apertures. The sleeve is configured to cover the first lip and the second lip with the third apertures aligning with the first apertures and the second apertures to enable attachment of the first body portion to the second body portion via the attachment mechanism.

In accordance with a twentieth aspect of the present disclosure, which can be combined with any other aspect described herein, the sleeve includes fourth apertures enabling attachment of an accessory attachment, the fourth apertures longer than the third apertures in a longitudinal direction of the sleeve.

Also, other objects, features, aspects and advantages of the disclosed pet kennels will become apparent to those skilled in the art in the field of pet kennels from the following detailed description, which, taken in conjunction with the annexed drawings, discloses preferred embodiments of a pet kennel with various features.

BRIEF DESCRIPTION OF THE DRAWINGS

Referring now to the attached drawings which form a part of this original disclosure.

DETAILED DESCRIPTION

Figure 1:
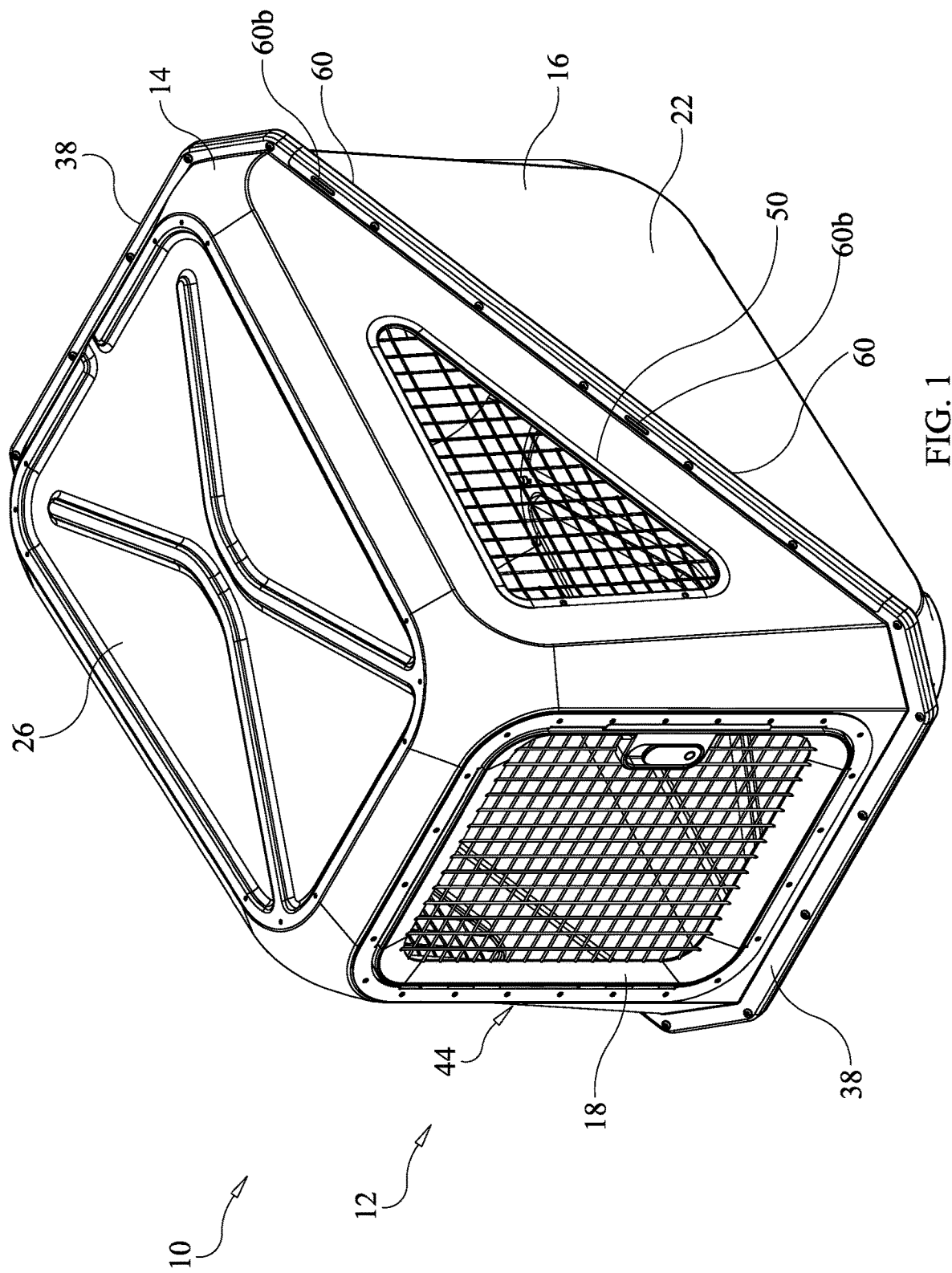
FIG. 1 illustrates a top perspective view of an example embodiment of a pet kennel in accordance with the present disclosure.
Figure 2:
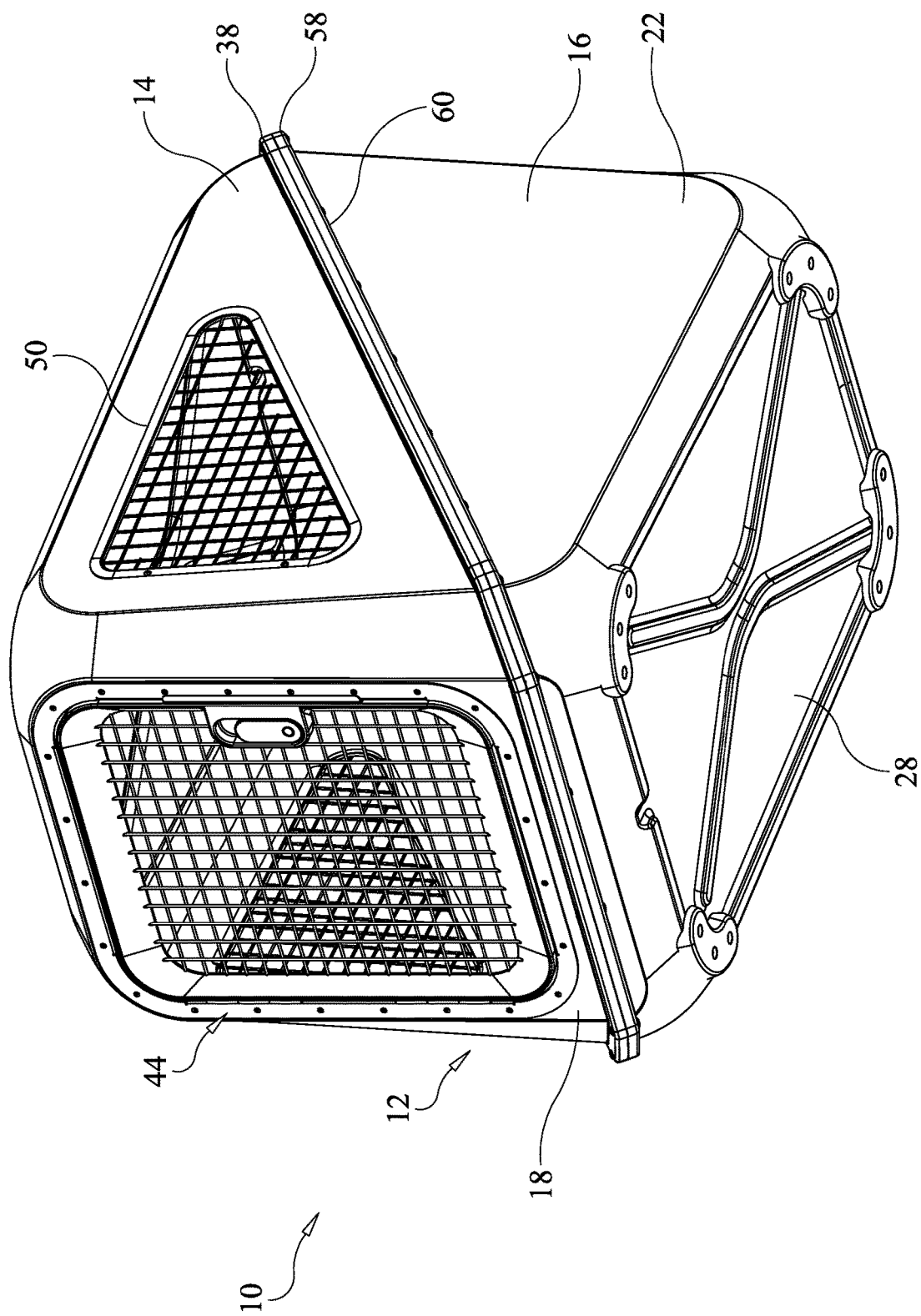
FIG. 2 illustrates a bottom perspective view of the pet kennel of FIG. 1.
Figure 3:
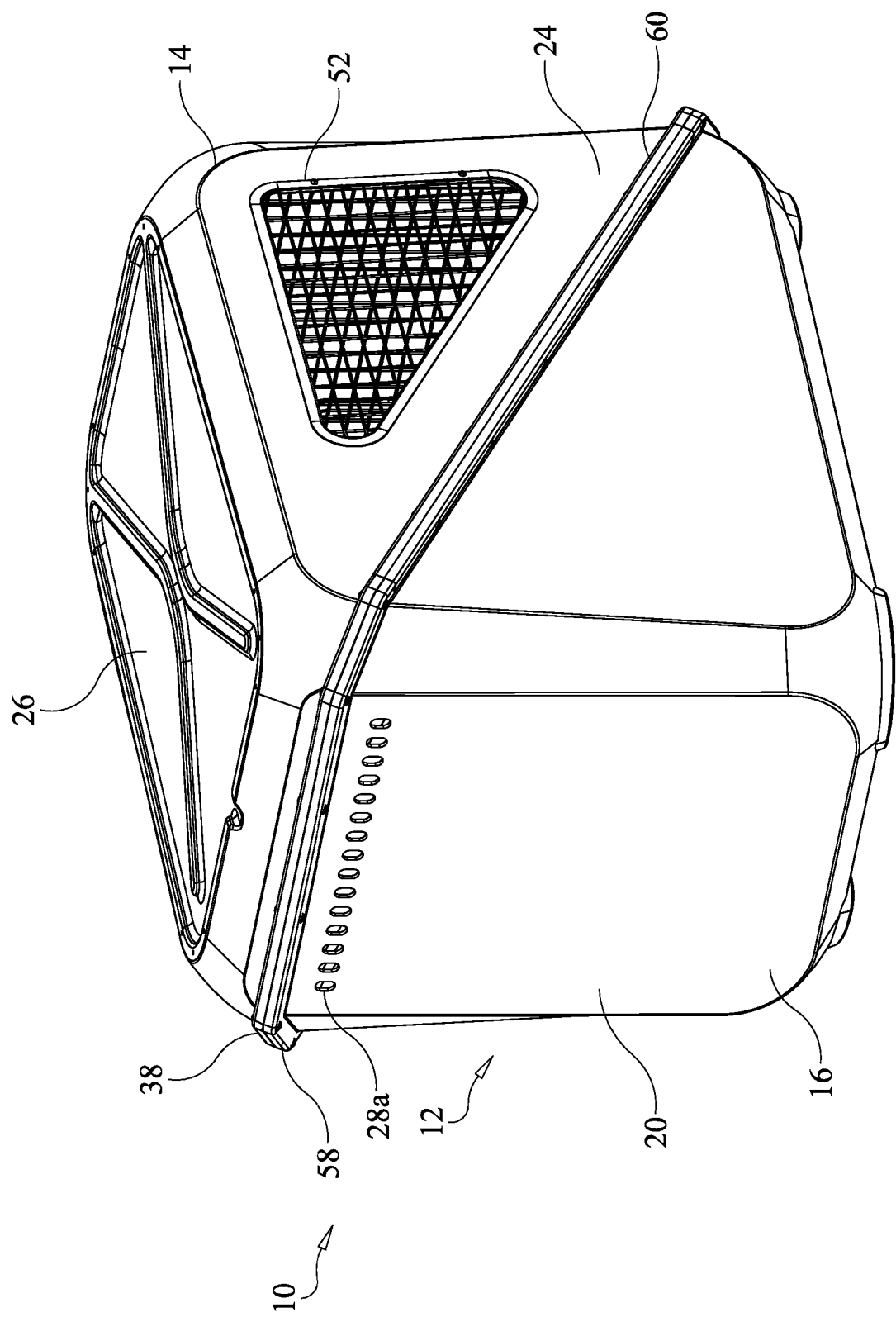
FIG. 3 illustrates a rear perspective view of the pet kennel of FIG. 1.
Figure 4:
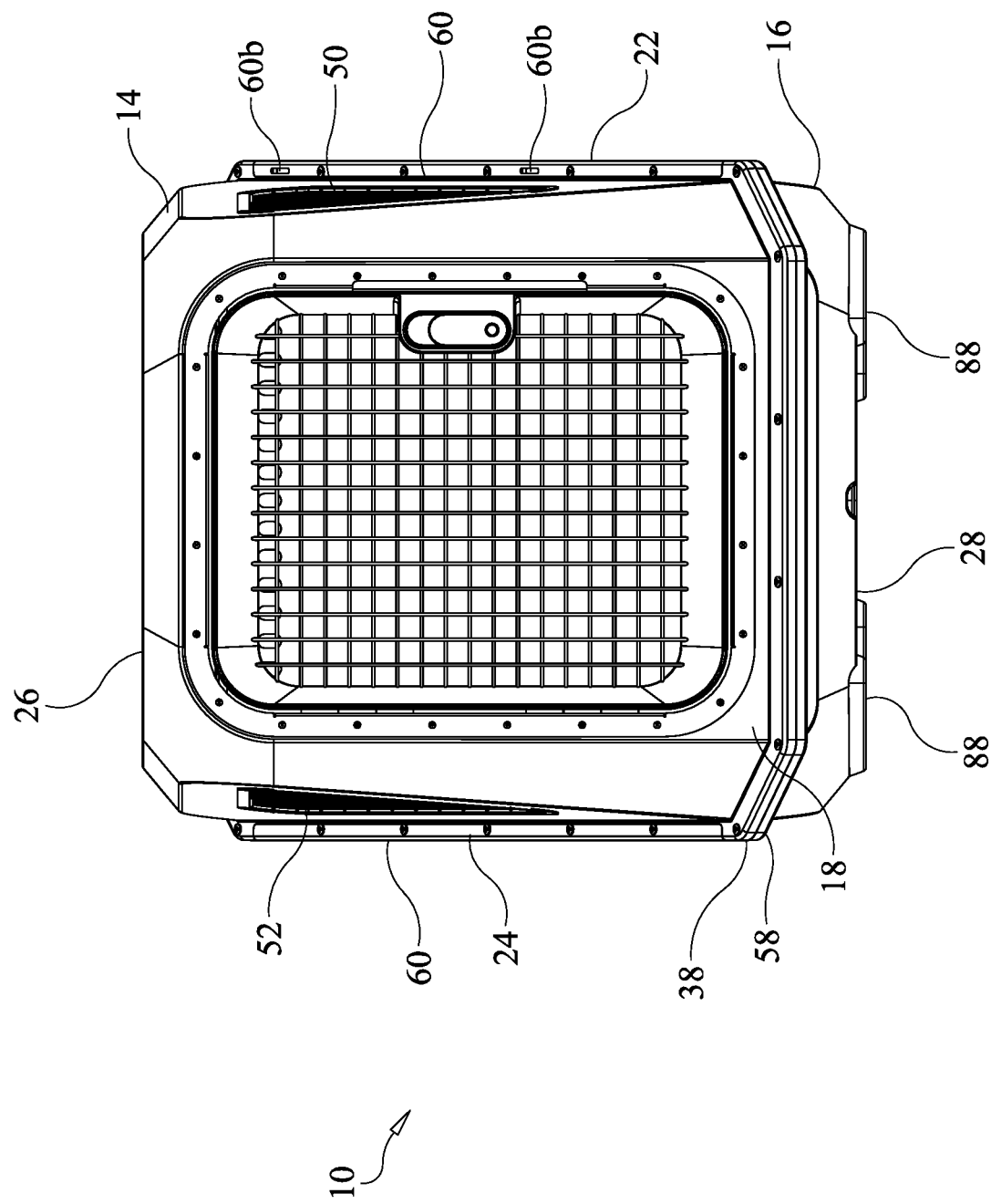
FIG. 4 illustrates a front elevational view of the pet kennel of FIG. 1.
Figure 5:
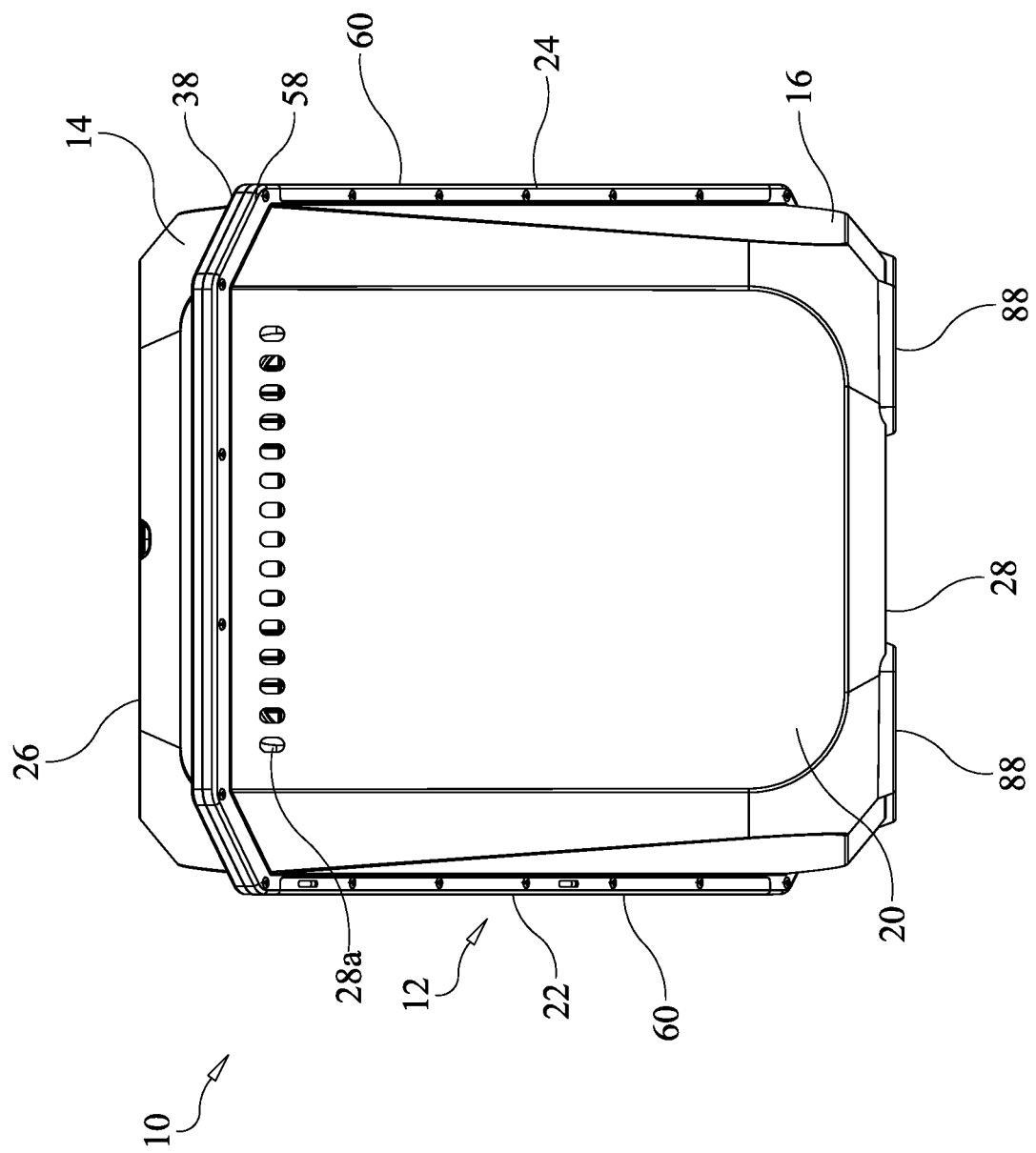
FIG. 5 illustrates a rear elevational view of the pet kennel of FIG. 1.
Figure 6:
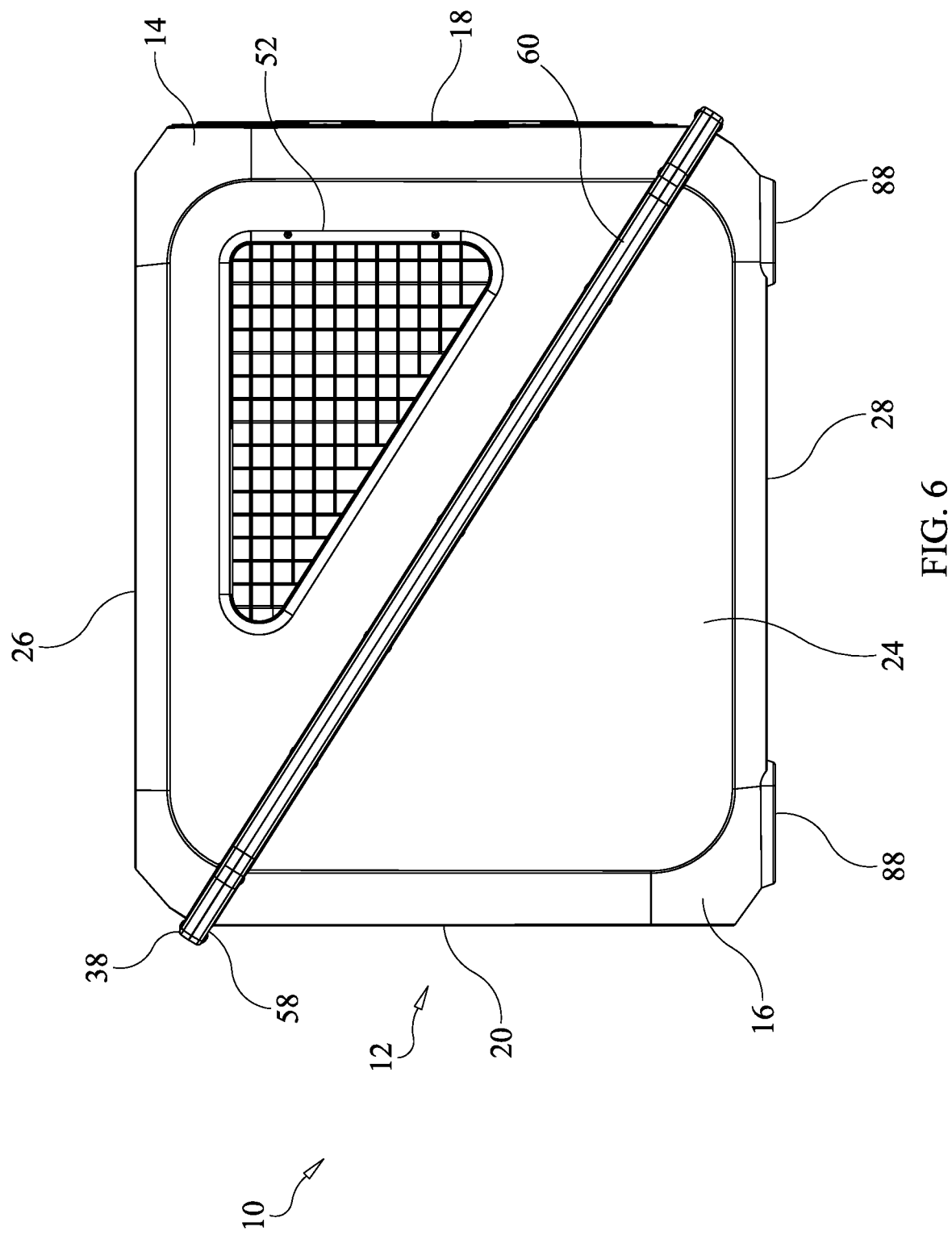
FIG. 6 illustrates a side elevational view of the pet kennel of FIG. 1.
Figure 7:
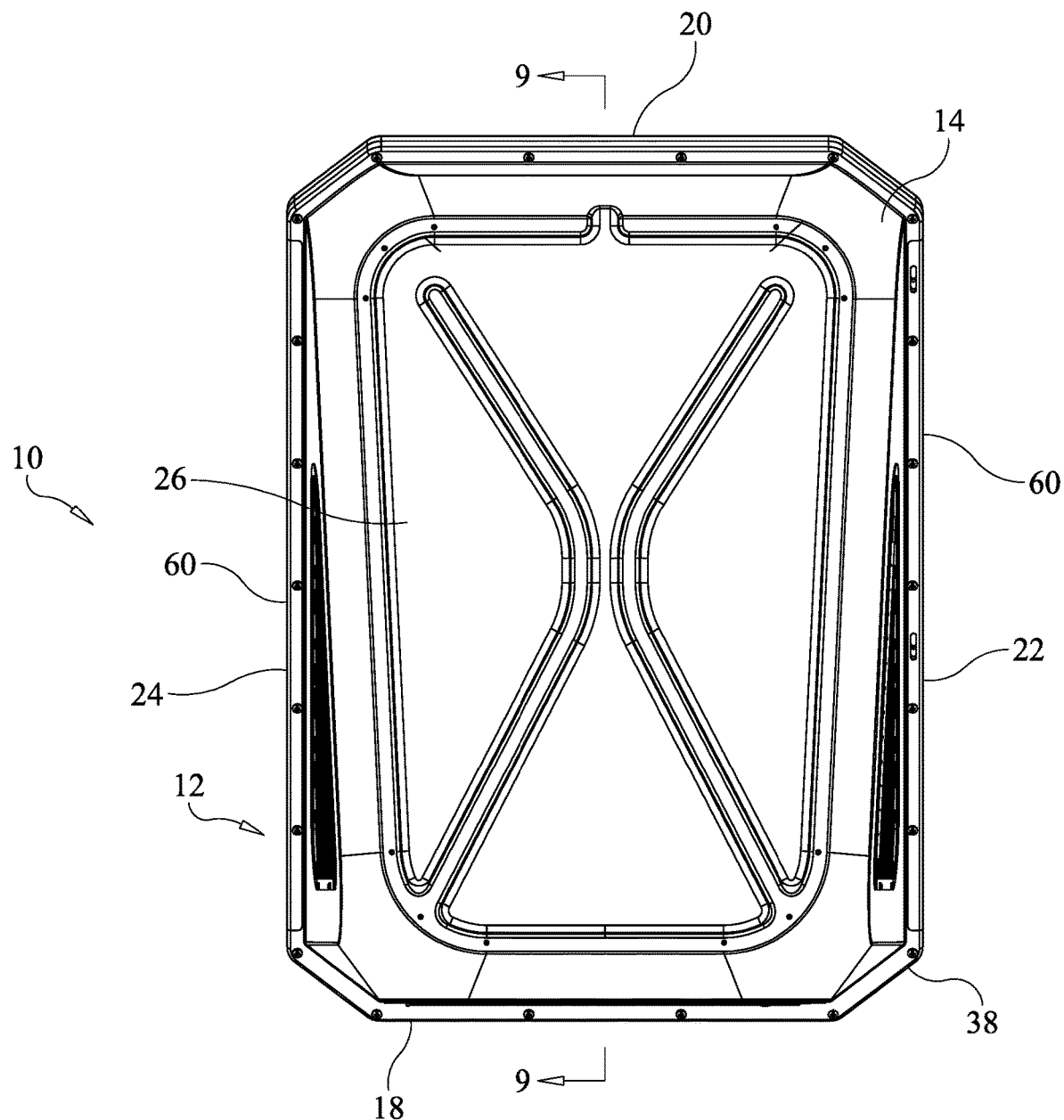
FIG. 7 illustrates a top plan view of the pet kennel of FIG. 1.
Figure 8:
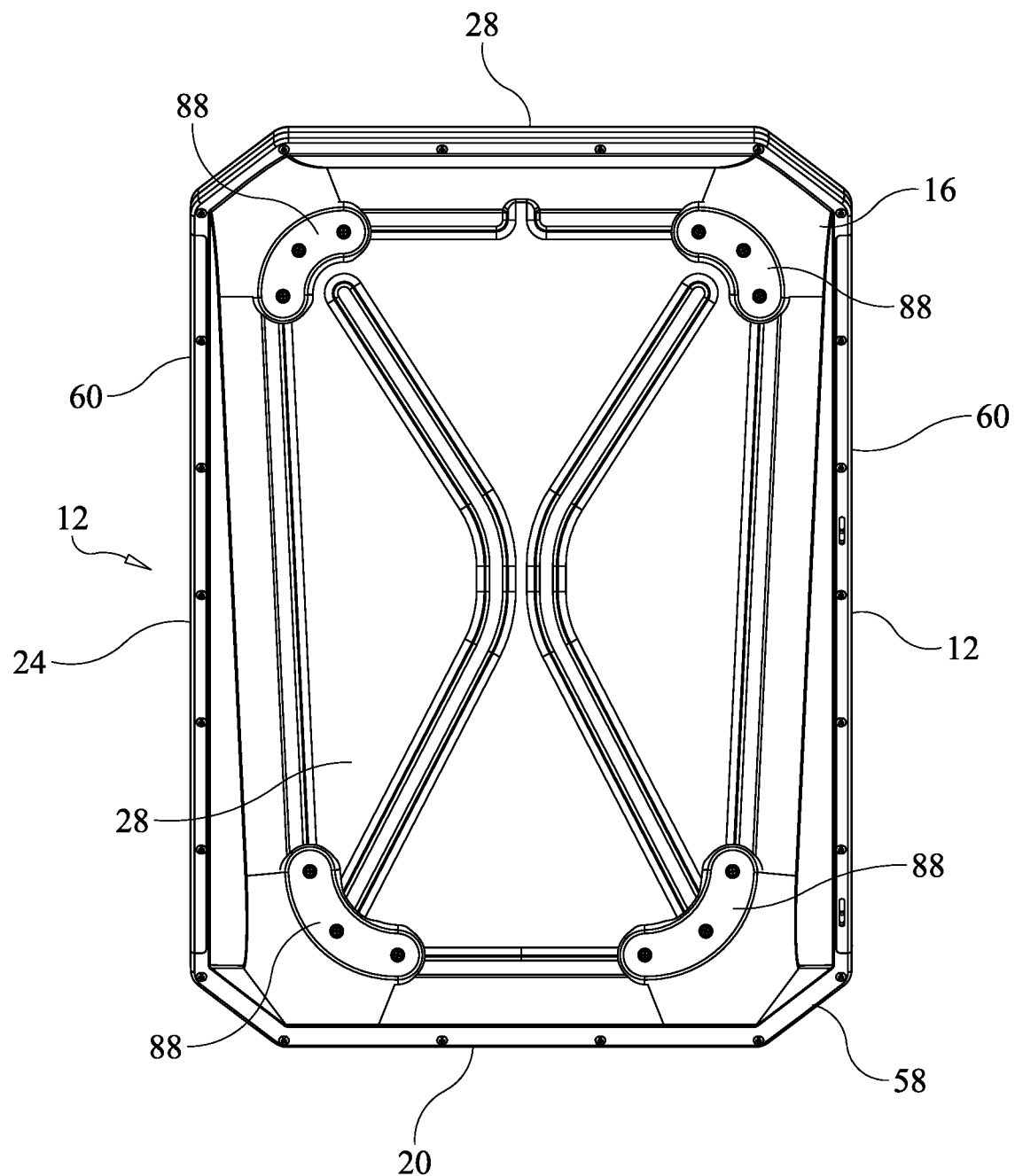
FIG. 8 illustrates a bottom plan view of the pet kennel of FIG. 1.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

FIGS. 1 to 9 illustrate an example embodiment of a pet kennel 10 in accordance with the present disclosure. In the illustrated embodiment, the pet kennel 10 includes a body 12. The body 12 has a first body portion 14 and a second body portion 16. When the first body portion 14 and the second body portion 16 are attached as shown in FIGS. 1 to 9, the pet kennel 10 has a front surface 18, a rear surface 20, a first lateral surface 22 (or left surface 22), a second lateral surface 24 (or right surface 24), a top surface 26 and a bottom surface 28, which enclose an interior space 30 sized and shaped for a pet.

Figure 10:
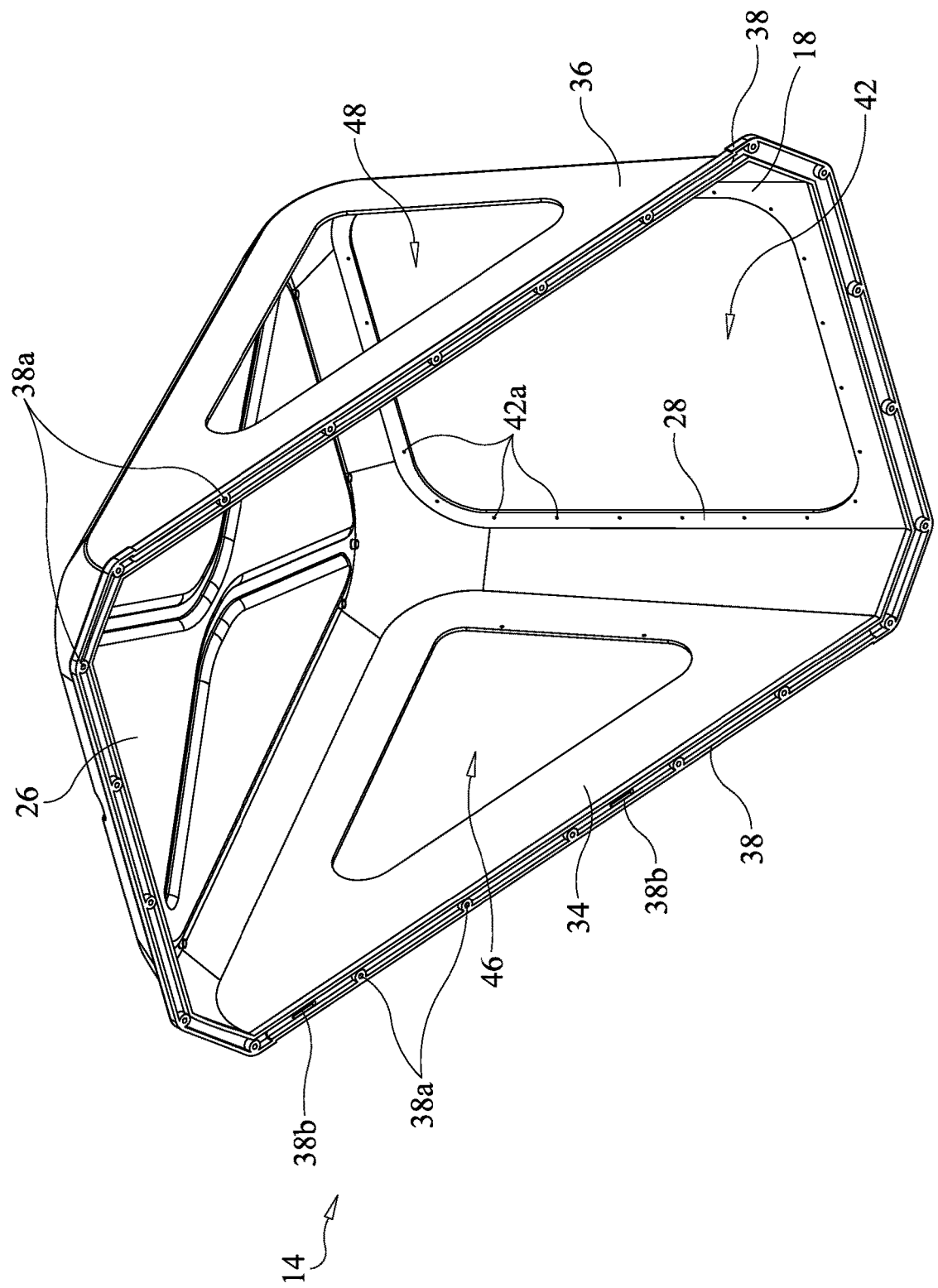
FIG. 10 illustrates a rear perspective view of an example embodiment of a first body portion of the pet kennel of FIG. 1.

As seen in FIG. 10, the first body portion 14 includes the front surface 18 and the top surface 26 of the body 12. The first body portion 14 also includes a first top part 34 of the first lateral surface 22 and a second top part 36 of the second lateral surface 24. As illustrated, the top parts 34, 36 each have a triangular shape, giving the first body portion 14 a triangular shape from the side (see, e.g., FIG. 6). This triangular shape is advantageous, for example, for displaying the first body portion 14 at a sale point without the second body portion 16 attached thereto. In an alternative embodiment, the first body portion 14 and the second body portion 16 can instead have horizontal borders where they meet. In an embodiment, the first body portion 14 can also include a portion of the rear surface 20.

Figure 9:
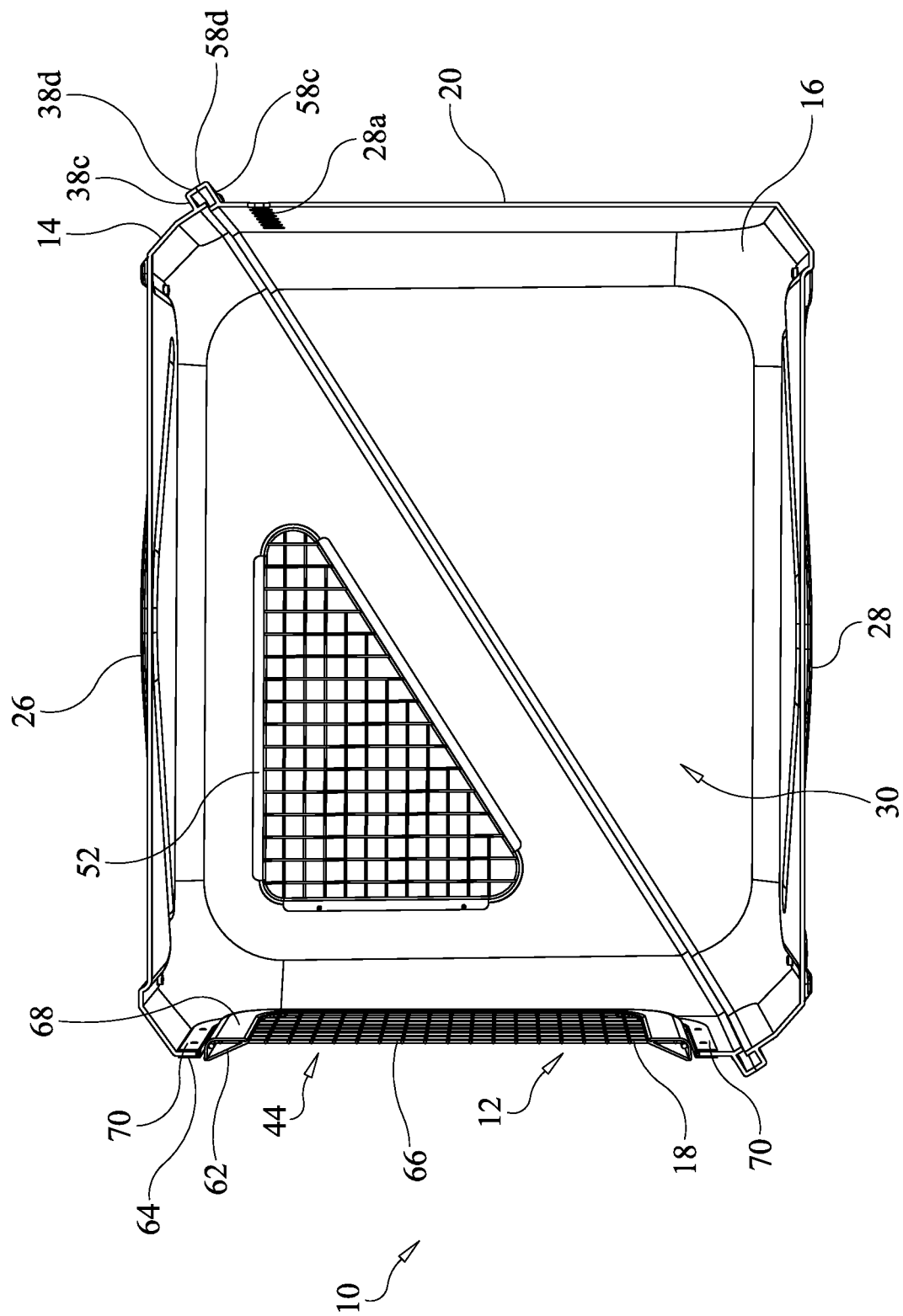
FIG. 9 illustrates a cross-sectional view of the pet kennel of FIG. 1 taken across lines 9-9 in FIG. 7.

The first body portion 14 includes a first lip 38 which extends around the bottom thereof. In the illustrated embodiment, the first lip 38 extends continuously around the bottom of the first body portion 14 to border along the front surface 18, the top surface 26, the first top part 34 and the second top part 36. The first lip 38 includes a plurality of apertures 38a which enable attachment of the first body portion 14 to the second body portion 16. In the illustrated embodiment, the first lip 38 also includes one or more second apertures 38b which are configured for an accessory attachment, as explained in more detail below. In the illustrated embodiment, the apertures 38b are longer in a longitudinal direction along the length of the first lip 38 to accommodate the accessory attachment. As illustrated, the apertures 38a and apertures 38b extend vertically through an outwardly extending portion 38c of the first lip 38. As seen in FIG. 9, the outwardly extending portion 38c of the first lip 38 extends radially outwardly from the front surface 18, the rear surface 20, the first lateral surface 22 and/or the second lateral surface 24. The first lip 38 also includes a downwardly extending portion 38d which extends downwardly from the outwardly extending portion 38c.

The first body portion 14 includes several apertures configured to allow air to flow through the body 12 and into the interior space 30. The apertures also allow viewing through the body 12 and into the interior space 30. The front surface 18 includes a front aperture 42. In the illustrated embodiment, the front aperture 42 encompasses the majority of the surface area of the front surface 18. The front aperture 42 is configured to receive a door assembly 44, which is discussed in more detail below. The front aperture 42 is sized and shaped for entry or exit of the pet from the interior space 30. The first top part 34 includes a first side aperture 46, and the second top part 36 includes a second side aperture 48. In the illustrated embodiment, each side aperture 46, 48 is triangular to generally match the shape of its respective top part 34, 36. The first side aperture 46 is configured to receive a first side grating 50. The second side aperture is configured to receive a second side grating 52. Each side grating 50, 52 is generally sized and shaped to match its corresponding aperture 46, 48. Each side grating 50 is also configured to allow air flow therethrough. The side gratings 50, 52 can be attached, for example, using an attachment mechanism such as a screw or a bolt and/or by another attachment means such as snap or press fitting.

In the illustrated embodiment, each side grating 50, 52 is attached at a respective side aperture 46, 48 by a combination of C-brackets and/or attachment mechanisms such as screws or bolts. As seen in FIG. 9, the side grating 52 includes a top side, a bottom side, and a lateral side. The top side is generally parallel to the top surface 26. The bottom side is generally parallel to the first lip 38. The lateral side is generally parallel to the front surface 18. One or more of the top side, the bottom side and the lateral side can include a C-bracket which fits over the edge of the side aperture 48 such that the C-bracket contacts both an inner surface and an outer surface of the first body portion 14 at the edge of the side aperture 48. The side grating 50 can be formed in the same way. The side gratings 50, 52 can include metal. It has been determined that forming the side gratings 50, 52 as a metal part allows the pet kennel 10 to pass auto and air safety crash tests.

The first body portion 14 can be formed as a single piece. In an embodiment, the first body portion 14 is formed as a single piece of plastic by known methods, for example, injection molding or other methods. The first body portion 14 can further include or be formed of a structural foam (e.g., nitrogen or chemical based). By forming certain other parts discussed herein as metal, the larger first body portion 14 can be formed of plastic with the pet kennel 10 still passing auto and air safety crash tests.

Figure 11:
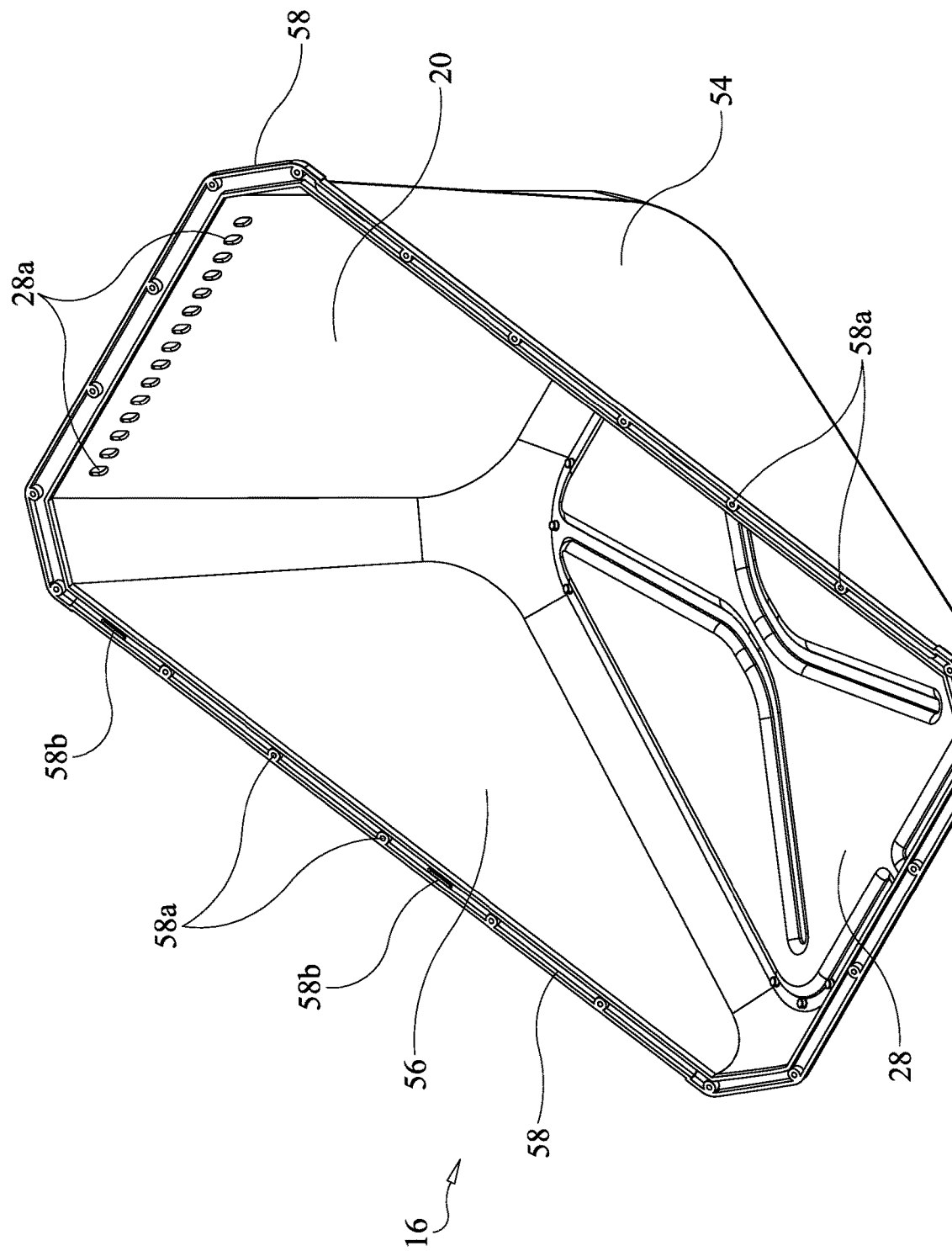
FIG. 11 illustrates a front perspective view of an example embodiment of a second body portion of the pet kennel of FIG. 1.

As seen in FIG. 11, the second body portion 16 includes the rear surface 20 and the bottom surface 28 of the body 12. The second body portion 14 also includes a first bottom part 54 of the first lateral surface 22 and a second bottom part 56 of the second lateral surface 24. As illustrated, the bottom parts 54, 56 each have a triangular shape, giving the second body portion 16 a triangular shape from the side (see, e.g., FIG. 6). In an alternative embodiment, the first body portion 14 and the second body portion 16 can instead have horizontal borders where they meet. In an embodiment, the second body portion 16 can also include a portion of the front surface 18.

The second body portion 14 includes a second lip 58 which extends around the top thereof. In the illustrated embodiment, the second lip 58 extends continuously around the top of the second body portion 14 to border along the rear surface 20, the bottom surface 28, the first bottom part 54, and the second bottom part 56. The second lip 58 includes a plurality of apertures 58a which enable attachment of the second body portion 16 to the first body portion 14. In the illustrated embodiment, the second lip 58 also includes one or more second apertures 58b which are configured for an accessory attachment, as explained in more detail below. In the illustrated embodiment, the apertures 58b are also longer in a longitudinal direction along the length of the second lip 58 to accommodate the accessory attachment. As illustrated, the apertures 58a and apertures 58b extend vertically through an outwardly extending portion 58c of the second lip 58. As seen in FIG. 9, the outwardly extending portion 58c of the second lip 58 extends radially outwardly from the front surface 18, the rear surface 20, the first lateral surface 22 and/or the second lateral surface 24. The second lip 58 also includes an upwardly extending portion 58d which extends upwardly from the outwardly extending portion 58c.

The rear surface 28 includes a plurality of apertures 28a configured to allow air to flow through the body 12 and into the interior space 30. In the illustrated embodiment, the plurality of apertures 28a are aligned laterally across the top of the rear surface 28, adjacent to and parallel with the second lip 58. Those of ordinary skill in the art will recognize from this disclosure that the number, position, size, shape and/or configuration of the plurality of apertures 28a can vary.

The configuration of the first lip 38 and the second lip 58 can vary. In the illustrated embodiment, the first lip 38 and the second lip 58 are angled downwardly from the rear surface 20 to the front surface 18. In another embodiment, the first lip 38 and the second lip 58 can be angled upwardly from the rear surface 20 to the front surface 18. In this embodiment, the first body portion 14 can include most or all of the rear surface 20, while the second body portion 16 can include most or all of the front surface 18. In another alternative embodiment, the first lip 38 and the second lip 58 can be generally horizontal (i.e., parallel to the top surface 26 and/or the bottom surface 28). In this embodiment, the first body portion 14 and the second body portion 16 would each form part of the front surface 18, the rear surface 20, the first lateral surface 22 and the second lateral surface 44.

The second body portion 16 can be formed as a single piece. In an embodiment, the second body portion 16 is formed as a single piece of plastic by known methods, for example, injection molding or other methods. The second body portion 16 can further include or be formed of a structural foam (e.g., nitrogen or chemical based). By forming certain other parts discussed herein as metal, the larger second body portion 16 can be formed of plastic with the pet kennel 10 still passing auto and air safety crash tests.

Figure 12:
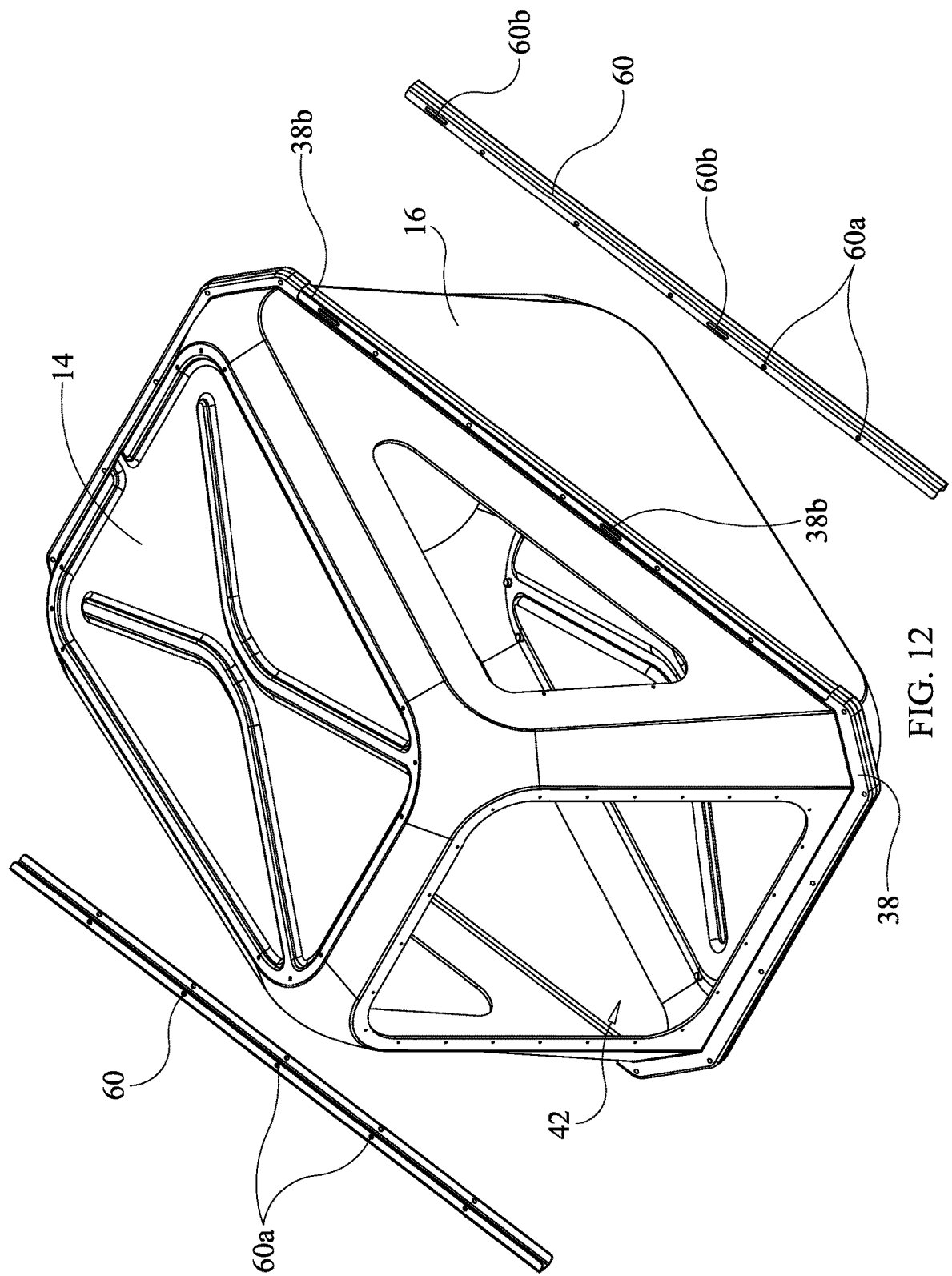
FIG. 12 illustrates an exploded perspective view of an example embodiment of various components of the pet kennel of FIG. 1.

As seen in FIG. 12, the first body portion 14 and second body portion 16 attach to form the body 12. More specifically, the first lip 38 aligns with and attaches to the second lip 58. The first lip 38 aligns with and overlaps the second lip 58 in the vertical direction, such that the outwardly extending portion 38c of the first lip 38 overlaps the outwardly extending portion 58c of the second lip 38 in the vertical direction. In an embodiment, the downwardly extending portion 38d of the first lip 38 is placed adjacent to the upwardly extending portion 58d of the second lip 58 in the vertical direction when the first lip 38 and the second lip 58 are aligned. In another embodiment, the downwardly extending portion 38d of the first lip 38 overlaps the upwardly extending portion 58d of the second lip 58 in the horizontal direction when the first lip 38 and the second lip 58 are aligned. The first lip 38 and the second lip 58 can be attached, for example, by placing attachment mechanisms such as screws or bolts through corresponding apertures 38a and apertures 58a.

As seen in FIG. 12, the body 12 can include one or more sleeve 60 configured to strengthen the attachment of the first lip 38 and the second lip 58. In the illustrated embodiment, the sleeve 60 is three-sided (e.g., U-shaped) to cover the top of the first lip 38 (e.g., the outwardly extending portion 38c), the bottom or the second lip 58 (e.g., the outwardly extending portion 58c), and the lateral sides of the first lip 38 and the second lip 58 (e.g., the downwardly extending portion 38d and the upwardly extending portion 58d). Each sleeve 60 includes a plurality of apertures first apertures 60a therethrough. The plurality of first apertures 60a align with the plurality of apertures 38a and the plurality of apertures 58a when the first lip 38 aligns with the second lip 58, allowing attachment mechanisms such as screws or bolts to be placed therethrough. Here, the body 12 include two sleeves 60, which are placed over the first lip 38 and the second lip 58 along the first lateral surface 22 and the second lateral surface 24. The body 12 can also include one or more sleeve 60 placed over the first lip 38 and the second lip 58 along the front surface 18 and/or the rear surface 20. The first lip 38 and the second lip 58 can also be attached without a sleeve 60 by aligning the plurality of apertures 38a and the plurality of apertures 58a and placing attachment mechanisms therethrough. In the illustrated embodiment, a sleeve 60 further includes one or more second apertures 60b which are configured for an accessory attachment, as explained in more detail below. In the illustrated embodiment, the second apertures 60b are longer in a longitudinal direction along the length of the sleeve 60 to accommodate the accessory attachment. In an embodiment, the sleeve 60 can be formed of metal or another material that is stronger than the material used for the first body portion 14 and the second body portion 16 to provide added strength to the connection of the first body portion 14 and the second body portion 16. It has been determined that forming the sleeve 60 as a metal part allows the pet kennel 10 to pass auto and air safety crash tests even if the first body portion 14 and second body portion 16 are plastic.

Figure 13:
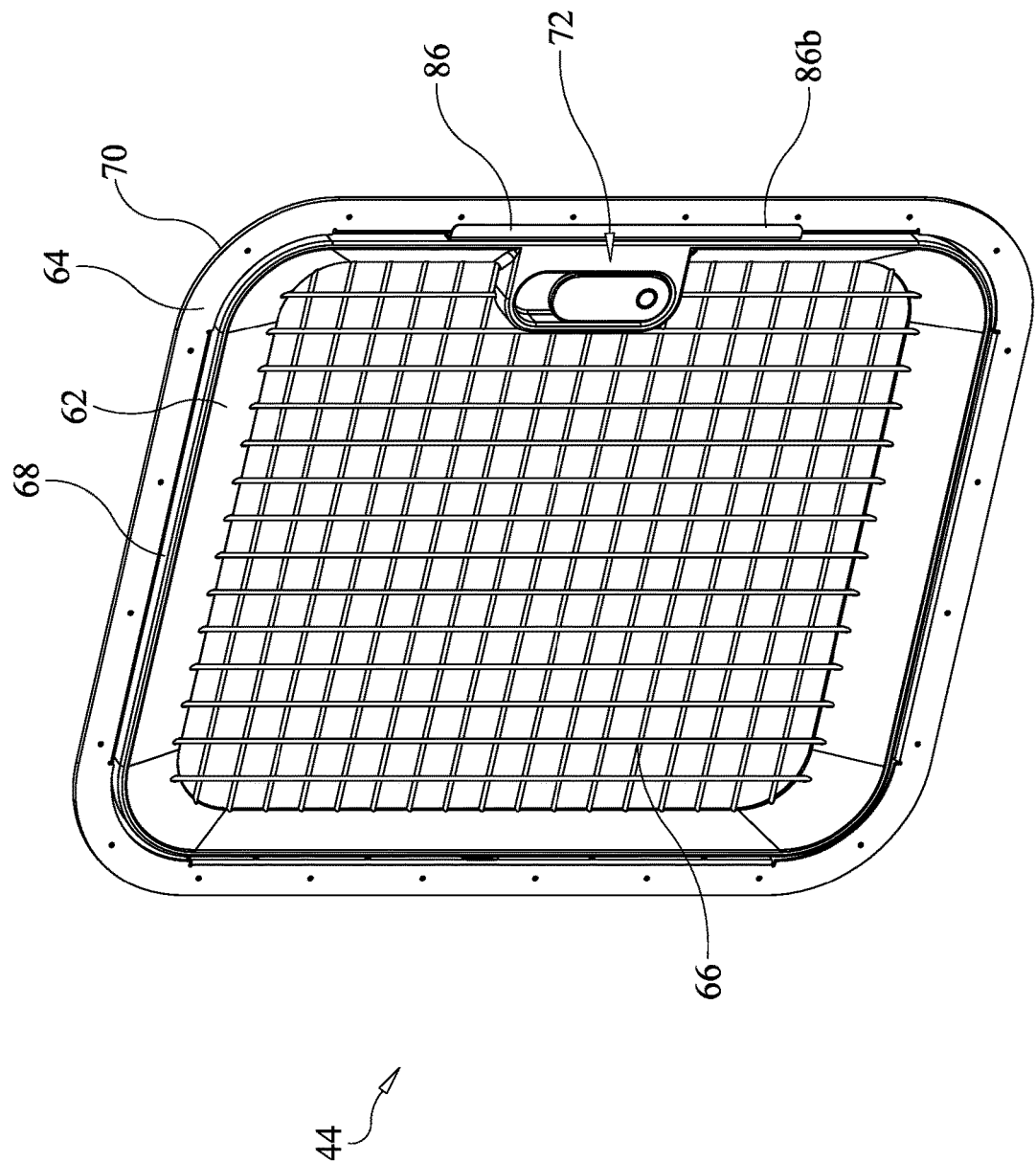
FIG. 13 illustrates a front perspective view of an example embodiment of a door assembly of the pet kennel of FIG. 1.
Figure 14:
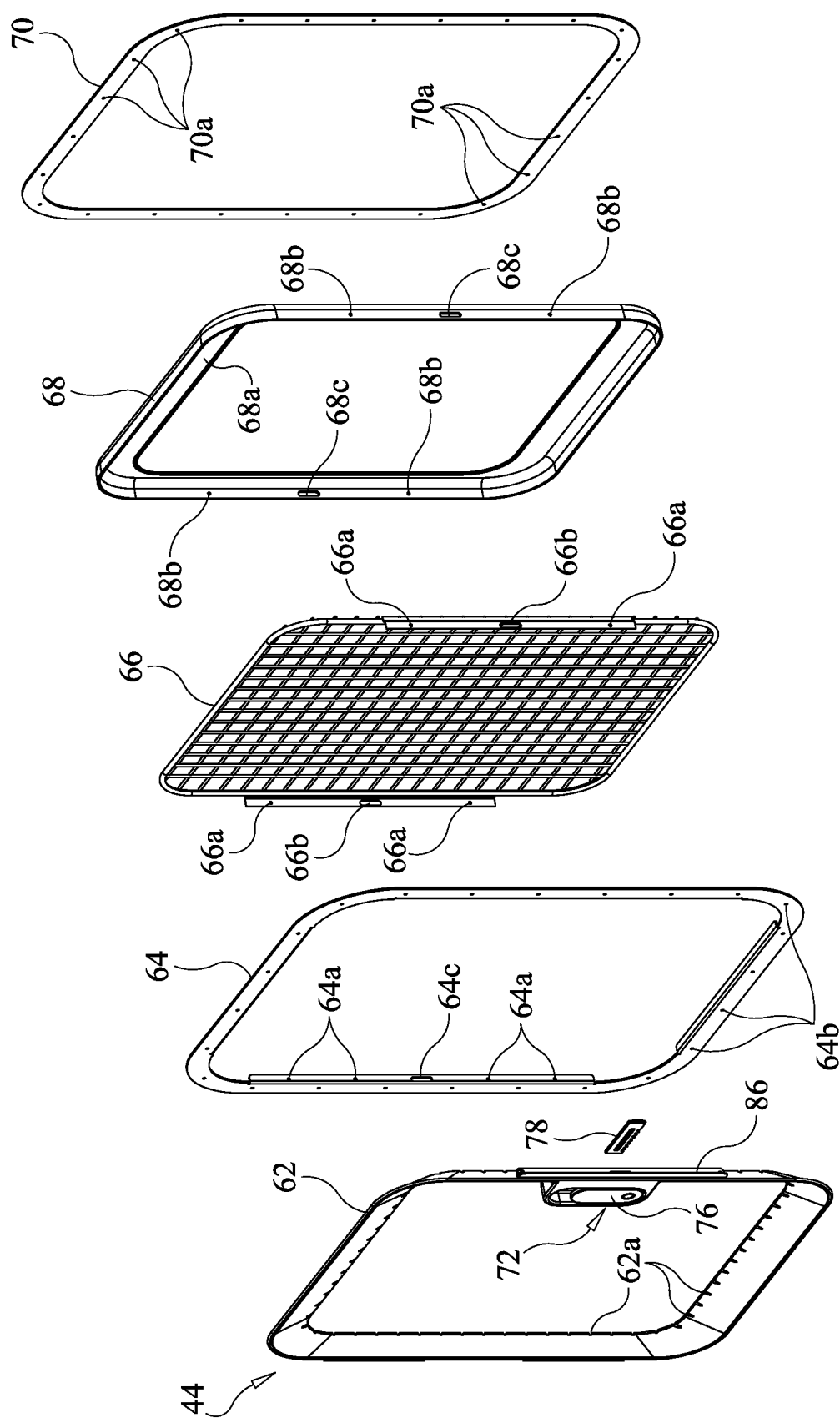
FIG. 14 illustrates an exploded view of the door assembly of FIG. 13.
Figure 15:
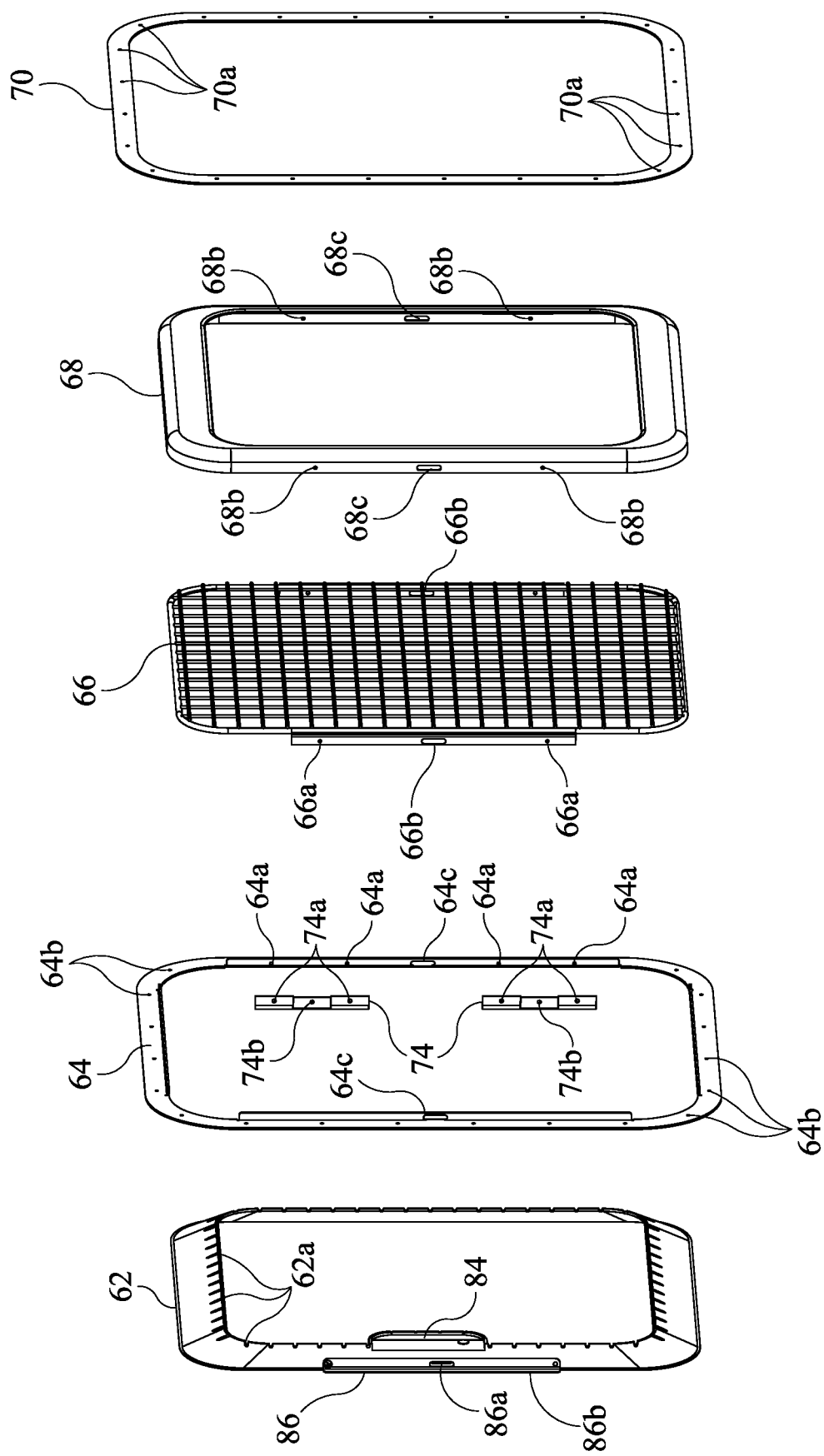
FIG. 15 illustrates another exploded view of the door assembly of FIG. 13.

FIGS. 13 to 15 illustrated the door assembly 44 in more detail. The door assembly 44 is configured to be attached to the first body part 14 at the front aperture 42. As illustrated, the door assembly 44 includes multiple parts. More specifically, the door assembly 44 includes one or more of a latching part 62, a hinge part 64, a grated part 66, a grate receiving part 68, and an inner body part 70. The latching part 62 further includes or is attached to a latching mechanism 72, which is illustrated in more detail in FIGS. 16 to 18. In the illustrated embodiment, the hinge part 64 and the inner body part 70 are formed with metal, while the latching part 62, the grated part 66 and the grate receiving part 68 are formed as another material such as plastic. It has been determined that forming the hinge part 64 and/or the inner body part 70 as metal parts allows the pet kennel 10 to pass auto and air safety crash tests, even if the body 12 and/or other parts of the door assembly 44 are formed of plastic.

The latching part 62, the grated part 66 and the grate receiving part 68 are fixedly attached to each other so as to pivot as a single unit with respect to the hinge part 64. The grate receiving part 68 includes a recessed area 68a which receives the grated part 66. The grate receiving part 68 further includes apertures 68b on a side surface thereof which align with corresponding apertures 66a on a side surface of the grated part 66. The grated part 66 can be received within the recessed area 68a of the grate receiving part 68 and fixedly attached to the grate receiving part 68, for example, by placing an attachment mechanism such as a screw or a bolt through corresponding apertures 66a, 68b.

The latching part 62 is fixedly attached to the grating part 66 and the grate receiving part 68. In the illustrated embodiment, the latching part 62 includes a plurality of indentations 62a which are configured to align with the bars which form the grating of the grated part 66. In an embodiment, this allows the latching part 62 to snap onto the grating of the grated part 66 for fixed attachment. Additionally or alternatively, the latching part 62 can be fixedly attached to the grated part 66 and/or the grate receiving part 68, for example, by placing an attachment mechanism such as a screw or a bolt through the latching part 62 and through corresponding apertures 66a and/or 68b and/or other apertures.

In the illustrated embodiment, the hinge part 64 is attached to the latching part 62, the grated part 66 and/or the grate receiving part 68 by one or more hinge 74 (see, e.g., FIG. 15). This allows the latching part 62, the grated part 66 and/or the grate receiving part 68 to pivot with respect to the hinge part 64. This also allows the latching part 62, the grated part 66 and the grate receiving part 68 to pivot as a single unit with respect to the hinge part 64. The hinge 74 includes first apertures 74a and second apertures 74b. The first apertures 74a enable attachment to corresponding apertures 64a on a side surface of the hinge part 64, for example, by placing an attachment mechanism such as a screw or a bolt through corresponding apertures 74a, 64a. The second apertures 74b enable attachment to corresponding apertures 66a and/or 68b, for example, by placing an attachment mechanism such as a screw or a bolt through corresponding apertures 74a, 66a and/or 68b.

The hinge part 64 is fixedly attached to the first body portion 14 at a perimeter of the aperture 42. The hinge part 64 substantially surrounds the perimeter of the aperture 42. More specifically, the hinge part 64 completely encircles the perimeter of the aperture 42. The hinge part 64 is larger than the aperture 42 in the vertical direction and the horizontal direction, enabling the hinge part 64 to substantially surround the aperture 42. By forming the hinge part 64 of metal with the dimensions shown, even when other parts of the door assembly 44 are formed with plastic, and by substantially surrounding the aperture 42 as shown, the pet kennel 10 passes auto and air safety crash tests without forming gaps between the door assembly 44 and the first body portion 14 when contact is made with the door assembly 44.

As illustrated, the apertures 64a of the hinge part which attach to the hinge 74 are not parallel to the apertures 64b of the hinge part 64 which attach to the first body portion 14. The hinge part 64 includes a rearward protrusion including the apertures 64a, such that the apertures 64a are generally perpendicular to the apertures 64b. The protrusion and its apertures 64a align with the aperture 42 of the first body portion 14 from the side direction (e.g., the direction in FIG. 9) when the hinge part 64 is attached to the first body portion 14. This configuration protects the protrusion, and thus the hinge 74, when the door assembly 44 is contacted by a strong outer force.

The hinge part 64 is fixedly attached to the inner body part 70. The hinge part 64 includes outer perimeter apertures 64b which correspond with outer perimeter apertures 70a on the inner body part 70. The outer perimeter apertures 64b enable attachment to corresponding outer perimeter apertures 70a, for example, by placing an attachment mechanism such as a screw or a bolt through corresponding apertures 74a, 64b. The attachment mechanism can further be placed through corresponding outer perimeter apertures 42a surrounding the front aperture 42 of the first body portion 14 (see, e.g., FIG. 10), enabling fixed attachment of the hinge part 64 and the inner body part 70 to the first body portion 14 at the front aperture 42. The hinge part 64 is placed against the outside of the front surface 18 at the front aperture 42 and the inner body part 70 is placed against the inside of the front surface 18 at the front aperture 42, thus locating the front surface 18 between the hinge part 64 and the inner body part 70 to strengthen the attachment of the door assembly 44 to the first body portion 16. This prevents gaps from forming around the perimeter of the door assembly 44 when a user or pet pulls or pushes on the door assembly 44.

FIGS. 16 to 19 illustrate the latching mechanism 72 in more detail. As illustrated, the latching mechanism 72 includes a latch slide 76, a rack lock 78, a biasing mechanism 80 and a rivet 82. In the illustrated embodiment, the biasing mechanism 80 is a spring which encircles the rivet 82 to bias the latch slide 76 against the latching part 62. However, it is noted that the latching mechanism can be any suitable mechanism that enables a latch point of one, two or more points along the periphery of the of the door assembly 44.

Figure 17:
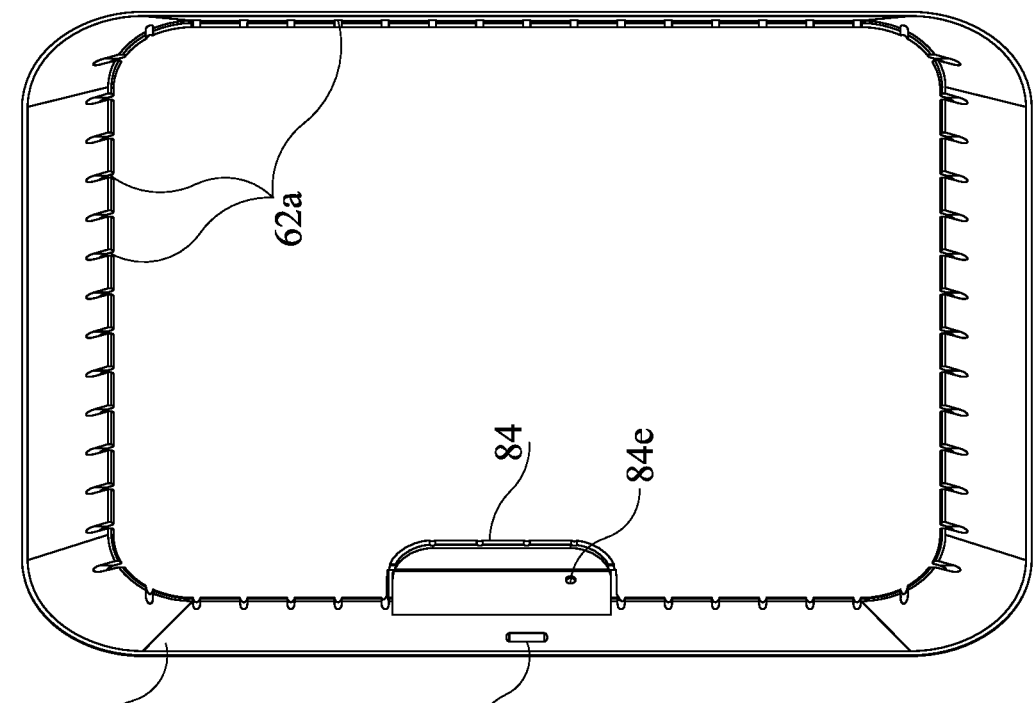
FIG. 17 illustrates a rear perspective view of a latching part of the door assembly of FIG. 13.
Figure 16:
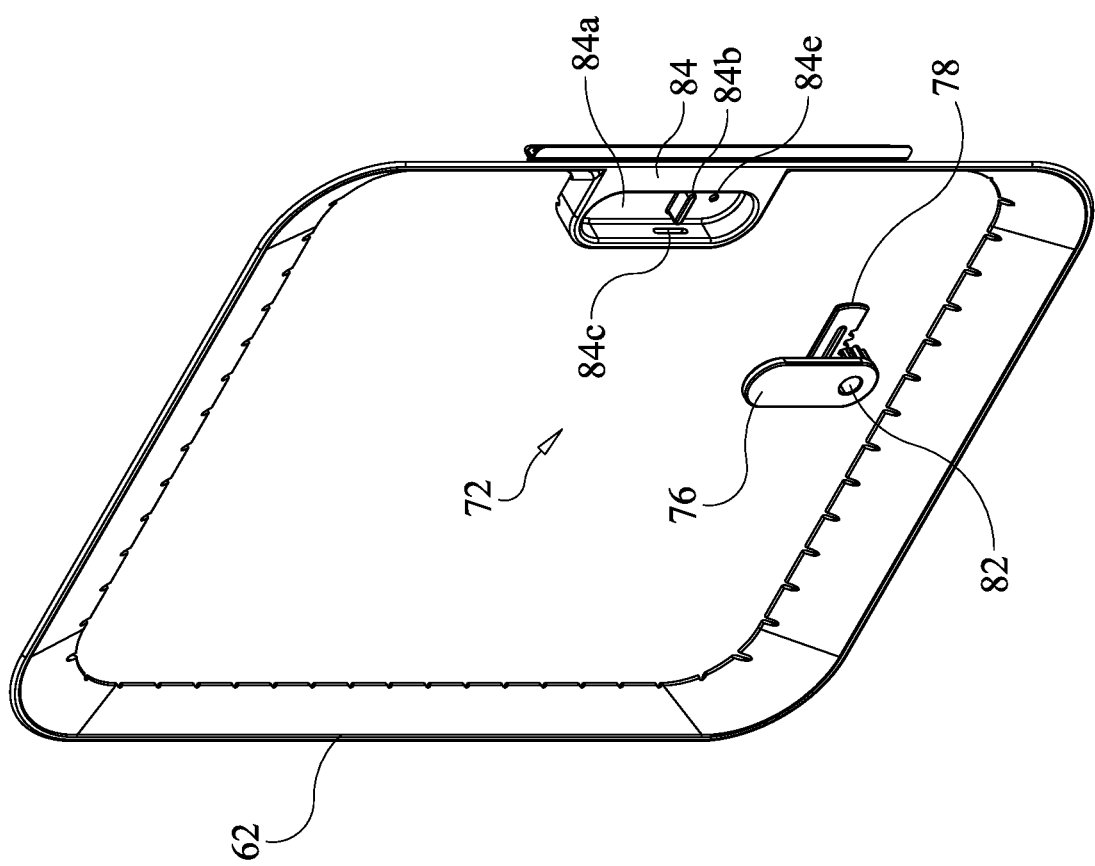
FIG. 16 illustrates an exploded view of an example embodiment of a latching mechanism of the door assembly of FIG. 13.

As seen in FIGS. 16 and 17, the latching part 62 includes a latch receiving portion 84 which extends radially inwardly from its side and receives the latching mechanism 72. The latch receiving portion 84 includes a recess 84a. The latch receiving portion 84 includes a lateral protrusion 84b which extends outwardly from the recess 84a. The latch receiving portion 84 includes a first aperture 84c on an inner radial side of the recess 84a and a second aperture 84d on the outer radial side of the recess 84a. The latch receiving portion 84 includes a third aperture 84e through the center of the recess 84a.

The latch slide 76 includes a gear 76a. The latch slide 76 further includes an aperture 76b which extends through the center of the gear 76a. The aperture 76b corresponds to the third aperture 84e of the latch receiving portion 84 when the latching mechanism 72 is attached to the receiving portion 84. The latch slide 76 is sized and shaped to fit within the recess 84a of the latch receiving portion 84 with the aperture 76b aligned with the third aperture 84e. The rivet 82 extends through the aperture 76b and the third aperture 84e to attach the latch slide 76 to the latch receiving portion 84. The biasing mechanism 80 encircles the rivet 82 and biases the latch slide 76 against the latch receiving portion 84. Thus, a user can pull the latch slide 76 out of the recess 84a against the biasing force of the biasing mechanism 80 and rotate the latch slide 76 around the rivet 82.

Figure 18:
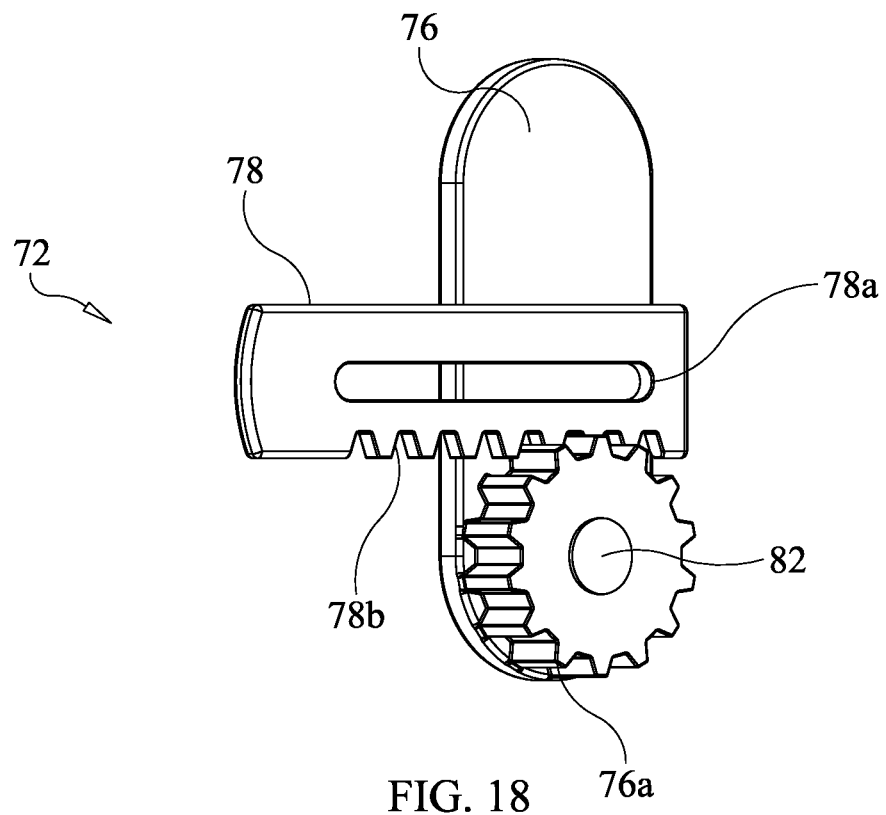
FIG. 18 illustrates a rear perspective view of the latching mechanism of the door assembly of FIG. 13.

The rack lock 78 includes a lateral aperture 78a and teeth 78b. The lateral aperture 78a is sized and shaped to be placed over the lateral protrusion 84b of the latch receiving portion 84. The lateral aperture 78 is longer than the lateral protrusion 84b to allow the rack lock 78 to slide laterally while attached to the lateral protrusion 84b. The rack lock 78 is located between the latch slide 76 and the latch receiving portion 84. As seen in FIG. 18, the teeth 78b interact with teeth on the gear 76a, so that rotating latch slide 76 with respect to the latch receiving portion 84 causes the rack lock 78 to slide laterally with respect to the latch receiving portion 84. When the rack lock 78 is in the position shown in FIG. 18, the latching mechanism 72 is locked, with the rack lock 78 protruding through the second aperture 84d on the outer radial side of the recess 84a. When the latch slide 76 is rotated (e.g., clockwise in FIG. 18 or counterclockwise in FIGS. 13 and 16), the rack lock 78 moves out the second aperture 84d to unlock the latching mechanism. As the latch slide 76 is rotated to the unlocked position, the rack lock 78 further slides through the first aperture 84c on the inner radial side of the recess 84a.

In the illustrated embodiment, each of the hinge part 64, the grated part 66 and the grate receiving part 68 include a corresponding aperture configured to receive the rack lock 78 when the latching mechanism 72 is locked. More specifically, the hinge part 64 includes a lock receiving aperture 64c, the grated part 66 includes a lock receiving aperture 66b, and the grate receiving part 68 includes a lock receiving aperture 68c. The rack lock 78 is configured to slide through each of these apertures 64c, 66b, 68c when the latch slide 76 is rotated to the locked position, which prevents the latching part 62, the grated part 66 and/or the grate receiving part 68 from pivoting with respect to the hinge part 64 using the hinge 74. This further prevents the latching part 62, the grated part 66 and/or the grate receiving part 68 from pivoting with respect to the inner body part 70 and/or the first body portion 16. In the illustrated embodiment, the hinge part 64 includes two lock receiving aperture 64c on opposite sides thereof, the grated part 66 includes two lock receiving aperture 66b on opposite sides thereof, and the grate receiving part 68 includes two lock receiving aperture 68c on opposite sides thereof, allowing each of the hinge part 64, the grated part 66 and the grate receiving part 68 to be easily installed in reverse orientations.

In the illustrated embodiment, the latching part 62 further includes or has attached thereto a door strike 86. In the illustrated embodiment, the door strike 86 is an L-shaped bracket. As illustrated, the door strike 86 includes a lock receiving aperture 86a therethrough. The rack lock 78 is configured to slide through the lock receiving aperture 86a when the latch slide 76 is rotated. As seen in FIG. 13, the door strike 86 also has a protrusion 86b which protrudes radially outwardly to prevent the hinge part 64, the grated part 66 and the grate receiving part 68 from swinging past the hinge part 64 and into the interior space 30.

The body 12 can further include one or more accessory attachments which allow the pet kennel 10 to sit on the ground, or alternatively be dragged or rolled. In the illustrated embodiment, the body 12 includes a plurality of feet 88 which attach to the bottom surface 28 of the second body portion 16. FIGS. 19 to 24 illustrate the pet kennels 10 including different accessory attachments. It should be understood by those of ordinary skill in the art from this disclosure that any of the attachments shown in FIG. 20 to 25 or other attachments can be interchangeably attached to the pet kennel 10 and detached as desired by the user.

Figure 19:
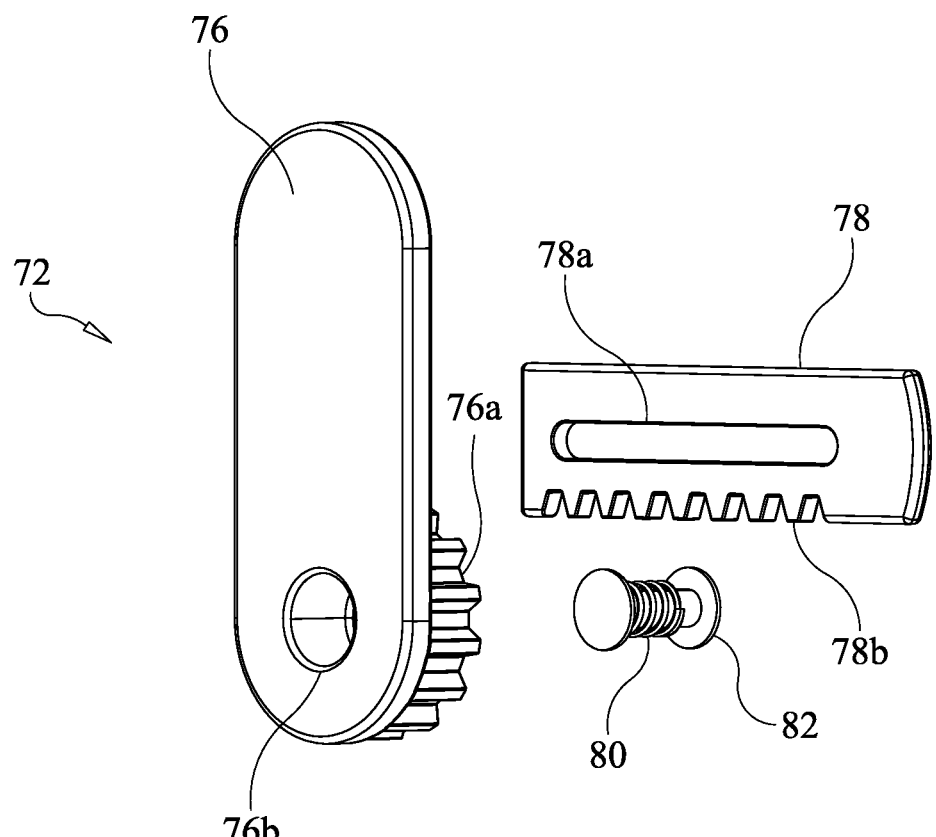
FIG. 19 illustrates an exploded perspective view of the latching mechanism of the door assembly of FIG. 13.
Figure 20:
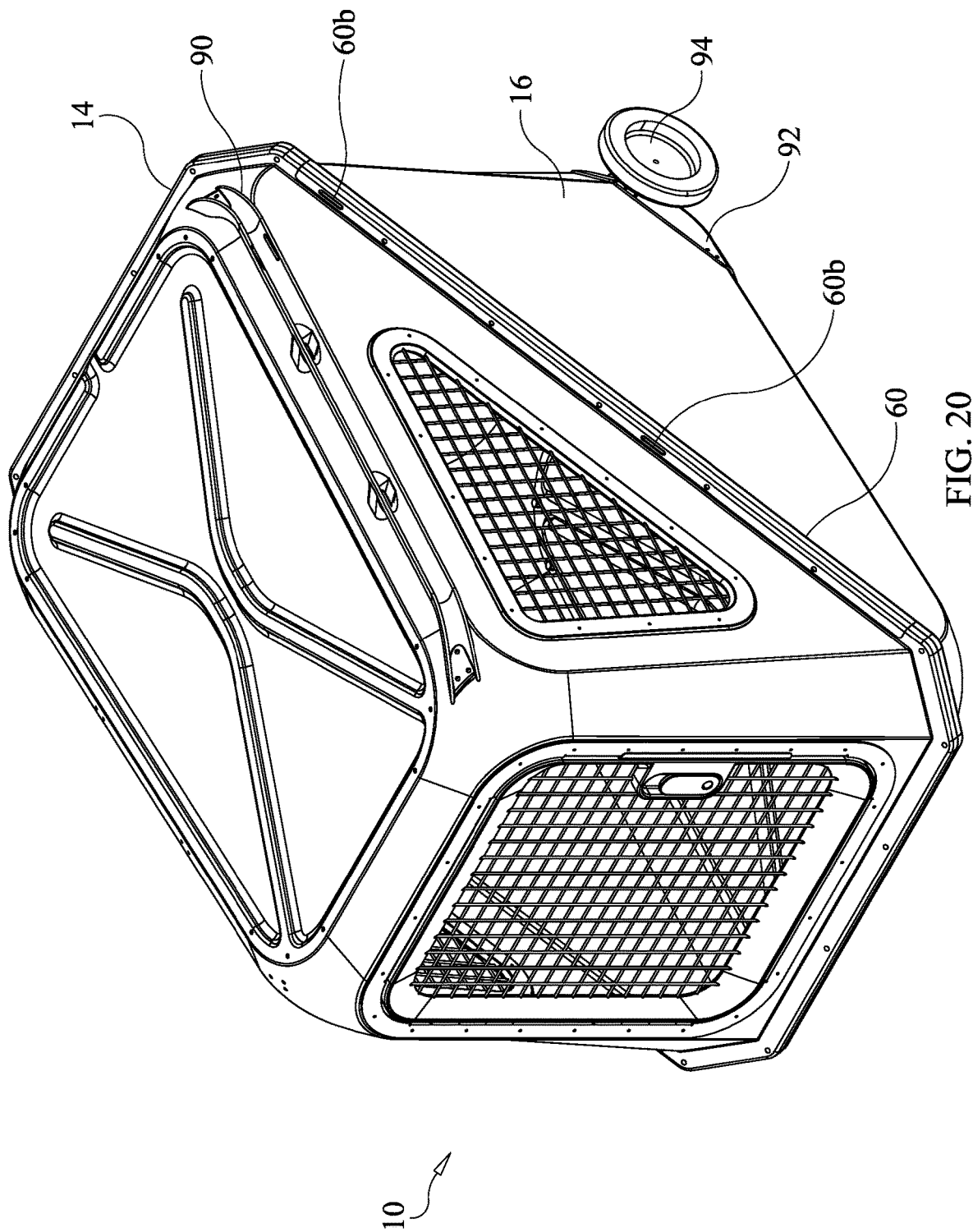
FIG. 20 illustrates a top perspective view of the pet kennel of FIG. 1 with accessories attached.
Figure 21:
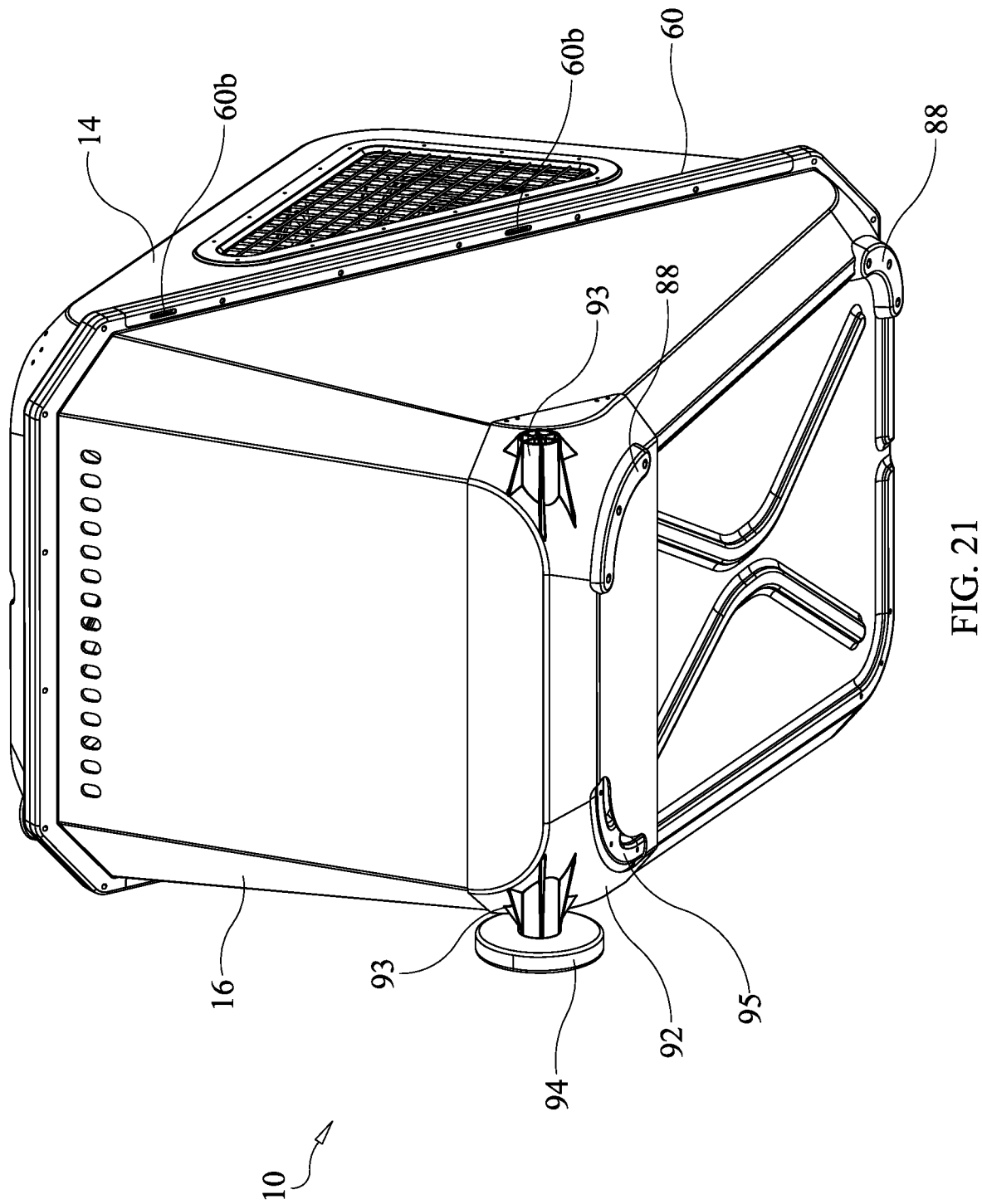
FIG. 21 illustrates a bottom perspective view of the pet kennel and accessories shown in FIG. 20.

FIGS. 20 and 21 illustrate pet kennel 10 with a handle 90 and a wheel attachment 92. The handle 90 is attached at or near the top surface of the first body portion 14. The wheel attachment 92 is attached at the corner along the rear surface 20 and bottom surface 28 of the second body portion 16. The wheel attachment 92 includes a plurality of wheel hubs 93 which can be attached to wheels 94. The wheel attachment 92 also includes apertures 95 which allow attachment of a foot 88. In FIGS. 19 and 20, feet 88 have been attached on one lateral side of the pet kennel, while a handle 90 and a wheel 94 have been attached to the other side, enabling a user to roll the pet kennel 10 on the wheel side or rest the pet kennel 10 on the opposite side.

Figure 22:
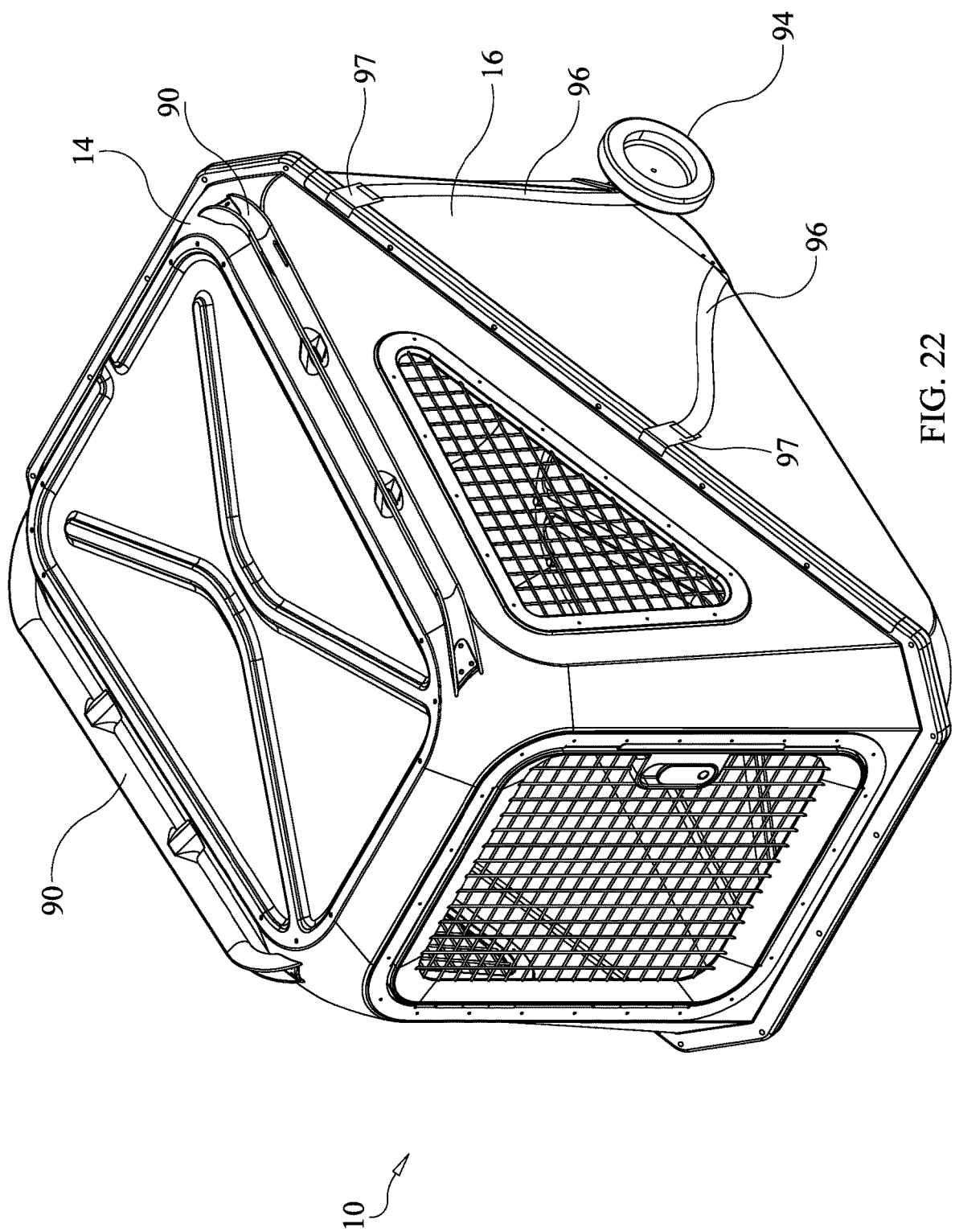
FIG. 22 illustrates a top perspective view of the pet kennel of FIG. 1 with accessories attached.
Figure 23:
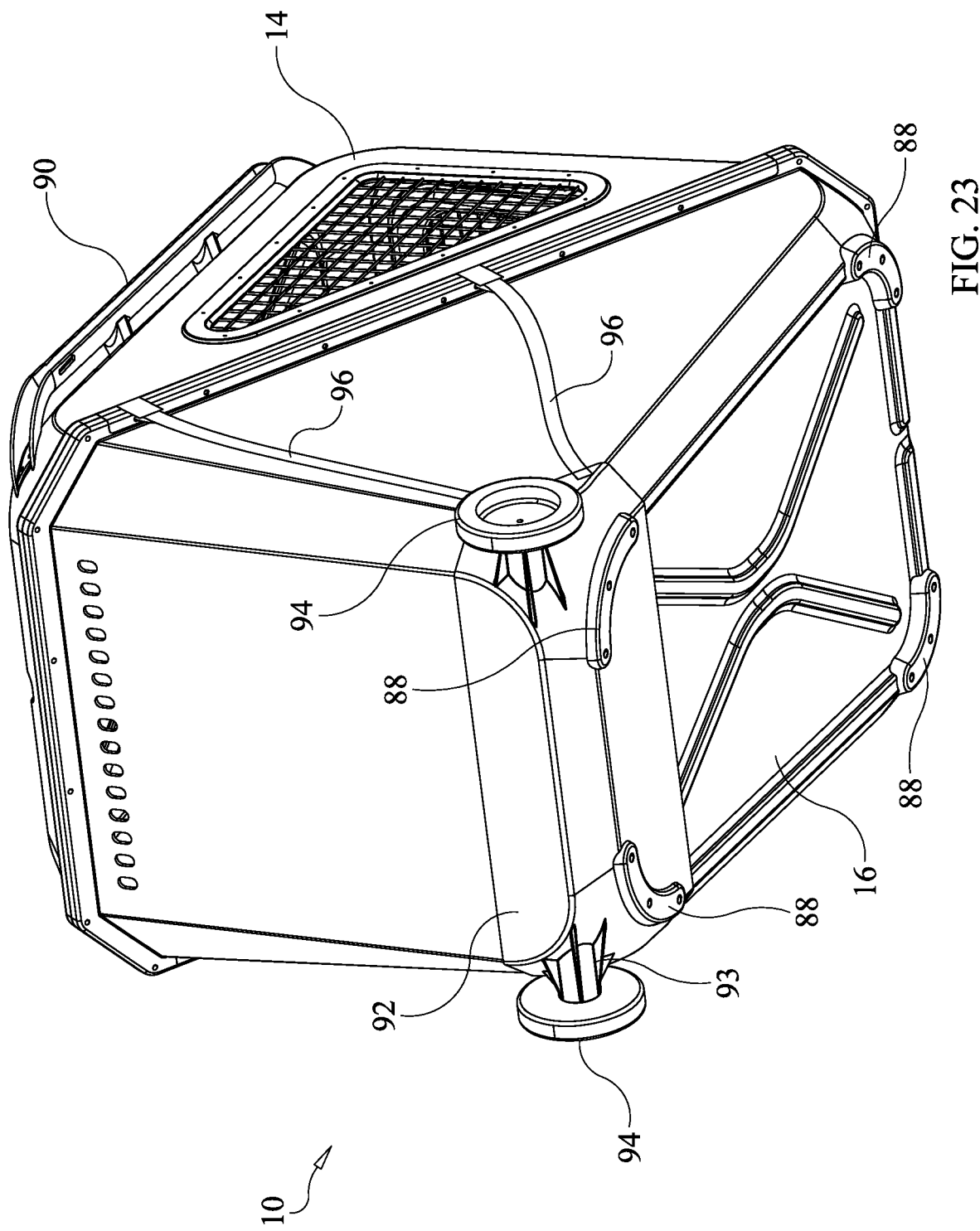
FIG. 23 illustrates a bottom perspective view of the pet kennel and accessories shown in FIG. 22.

FIGS. 22 and 23 illustrate pet kennel 10 with an additional handle 90 and wheel 94 attached. Here, the handles 90 are attached at or near the top surface of the first body portion 14 on opposite lateral sides of the pet kennel 10. The wheel attachment 92 is attached at the corner along the rear surface 20 and bottom surface 28 of the second body portion 16. The wheel attachment 92 includes two wheels attached to wheel hubs 93. Feet 88 have also been attached at the apertures 95 (e.g., FIG. 21) in the wheel attachment 92. The wheel attachment 92 is further secured using straps 96. The straps 96 include connectors 97 which attach to the body 12 at the first lip 38 and/or second lip 58. More specifically, the connectors 97 include protrusions which extend into the second apertures 60b of the sleeve 60, the second apertures 38b of the first lip 38 and/or the second apertures 58b of the second lip 58.

Figure 24:
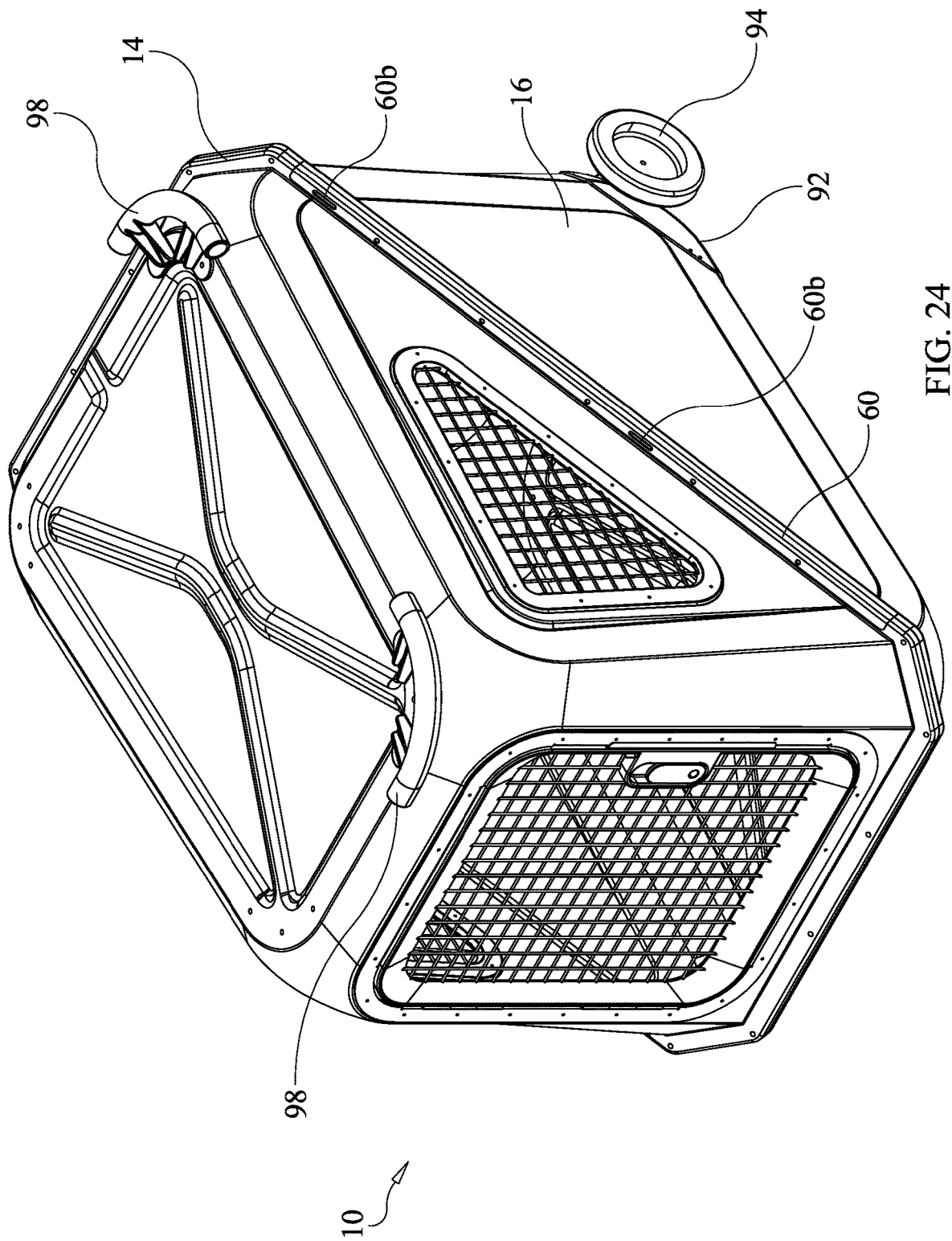
FIG. 24 illustrates a top perspective view of the pet kennel of FIG. 1 with accessories attached.
Figure 25:
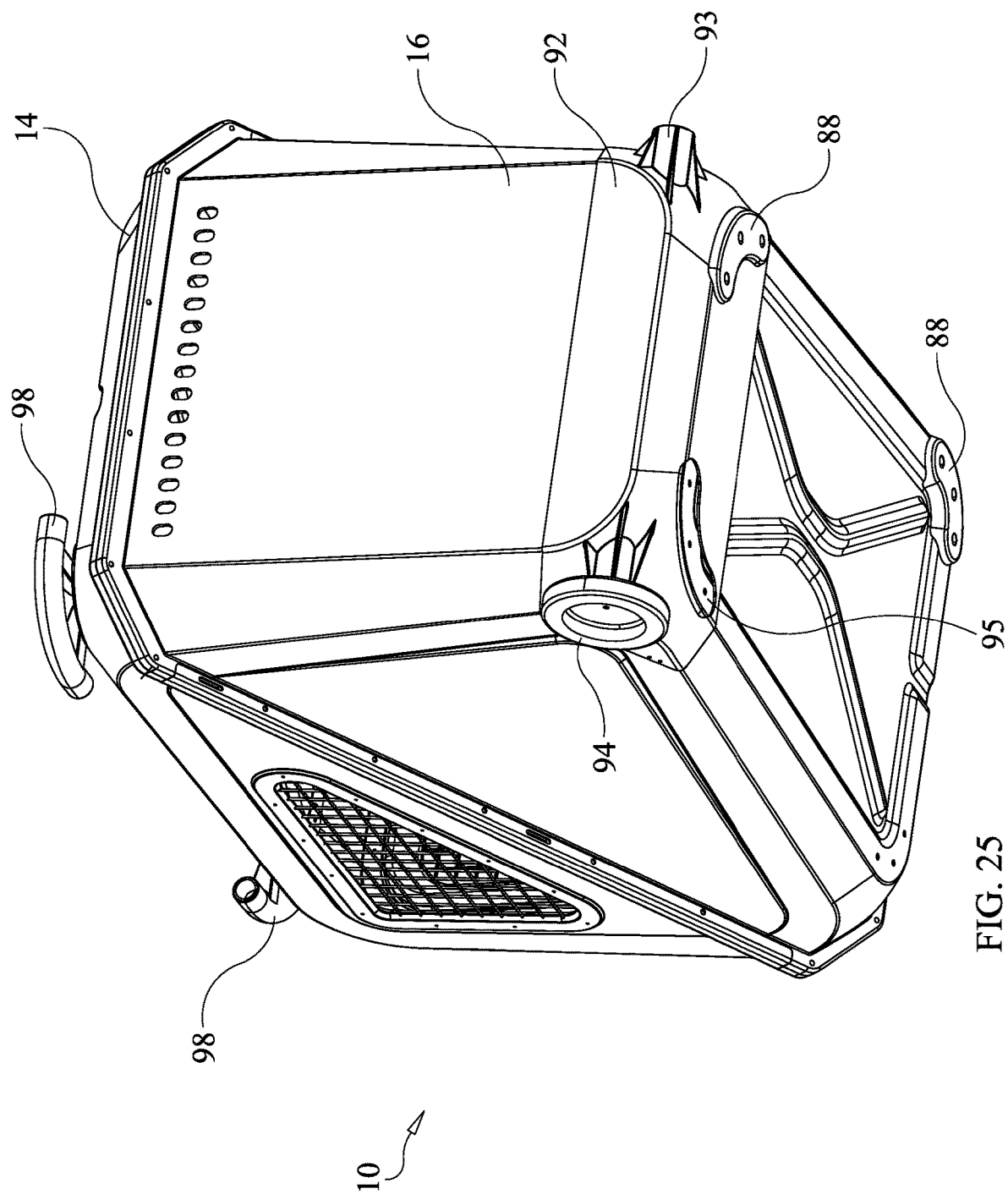
FIG. 25 illustrates a bottom perspective view of the pet kennel and accessories shown in FIG. 24.

FIGS. 24 and 25 are similar to FIGS. 20 and 21 but include an alternative handle 98 instead of handle 90. More specifically, the pet kennel 10 includes two handles 98. Here, each handle 98 is placed at or near the top surface of the first body portion 14 at a corners adjacent to the front surface 18 and the rear surface 20.

The pet kennel 10 described herein can be constructed in a variety of ways. As described herein, the body 12 is configured to be manufactured so as to be provided with an interior space 30 configured for a pet. The door assembly 44 is configured to be manufactured so as to be provided with the latching mechanism 72. The door assembly 44 is configured to be attached to the body 12 at an aperture sized and shaped for a pet, for example at the aperture 42 discussed herein, such that the latching mechanism 72 locks and unlocks the door assembly 44 from the body 12, enabling entry and exit of the pet from the interior space 30.

The body 12 can be constructed with a first body portion 14 and a second body portion 16 as described herein. More specially, the first lip 38 of the first body portion 14 can be aligned with and placed against the second lip 58 of the second body portion 16 and attached thereto. The first lip 38 and the second lip 58 can be attached after being covered by at least one sleeve 60 as described herein. An attachment mechanism can then be inserted through the first lip 38, the second lip 58, and/or the sleeve 60. When attached, the first body portion 14 and the second body portion 16 form the interior space 30.

The door assembly 44 can be partially or fully constructed when attached to the body 12. The door assembly 44 can be attached to a first body portion 14 before or after the first body portion 14 is attached to a second body portion 16. The door assembly 44 can be constructed with one or more of a latching part 62, a hinge part 64, a grated part 66, a grate receiving part 68, and/or an inner body part 70 as described herein. The latching part 62, the grated part 66 and the grate receiving part 68 can be fixedly attached to each other before or after being pivotally attached to the hinge part 64. The hinge part 64 can be fixedly attached to the inner body part 70 before, during or after being attached to the body 12. In an embodiment, the hinge part 64 and the inner body part 70 are fixedly attached by being located on opposite sides of a wall of the body 12 and being simultaneously attached to the body 12. More specifically, the hinge part 64 is attached outside of the body 12 at the aperture 42, while the inner body part 70 is attached inside of the body 12 at the aperture 42. Thus, in an embodiment, the latching part 62, the hinge part 64, the grated part 66 and the grate receiving part 68 can be attached to each other, and then this group of parts can be attached to the body 12 simultaneously with the inner body part 70.

The door assembly 44 can further be provided for attachment to the body 12 with the latching mechanism 72 already installed, with the latching mechanism 72 including the latch slide 76 and the rack lock 78, such that when the door assembly 44 is attached to the body 12 the latch slide 76 is rotatable to cause the rack lock 78 to lock and unlock the door assembly 44.

With the pet kennel 10 described herein, one or more damaged components can be removed and replaced while retaining other undamaged parts. For example, one of the first body portion 14, the second body portion 16, the door assembly 44 and the latching mechanism 72 can be removed and replaced from the pet kennel 10 while retaining the other of these components.

The embodiments described herein provide improved pet kennels and/or methods for manufacturing and constructing the improved pet kennels. These pet kennels are advantageous, for example, because the illustrated construction improves strength and prevents pets from escaping. It should be understood that various changes and modifications to the pet kennels and corresponding components described herein will be apparent to those skilled in the art and can be made without diminishing the intended advantages.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "section" or "portion" when used in the singular can have the dual meaning of a single part or a plurality of parts.

The term "configured" as used herein to describe a component, section or part of a device that is constructed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed:

1. A pet kennel comprising:
   a body having an interior space configured for a pet, the body including at least one aperture sized and shaped for the pet; and
   a door assembly attached to the body at the aperture, the door assembly including a latching part pivotally attached to a hinge part, the latching part including or attached to a latching mechanism configured to lock and unlock the door assembly, the hinge part fixedly attached to the body so as to substantially surround a perimeter of the aperture,
   the latching mechanism including a latch slide including a gear having first teeth, a rack lock having a lateral aperture and second teeth, and a biasing mechanism,
   the door assembly including a latch receiving portion having a recess configured to receive the latch slide and a lateral protrusion extending from the recess into the lateral aperture, and
   the first teeth of the gear interacting with the second teeth of the rack lock to cause the rack lock to translate linearly to unlock the door assembly from the body when the latch slide is pulled from the recess against a biasing force of the biasing mechanism and rotated with respect to the recess.

2. The pet kennel of claim 1, wherein
   the hinge part includes metal, and
   the latching part includes plastic.

3. The pet kennel of claim 1, wherein
   the door assembly includes an inner body part fixedly attached to the hinge part and the body such that the body is located between the hinge part and the inner body part.

4. The pet kennel of claim 1, wherein
   the door assembly includes a grated part and a grate receiving part, and
   the latching part is fixedly attached to the grated part and the grate receiving part such that the latching part, the grated part and the grate receiving part pivot as one piece with respect to the hinge part.

5. The pet kennel of claim 1, wherein
   the latch slide is rotatable to cause the rack lock to lock and unlock the door assembly.

6. The pet kennel of claim 1, wherein
   the biasing mechanism is configured to bias the latch slide against the rack lock.

7. The pet kennel of claim 1, wherein
   the latching mechanism includes a rivet which extends through the latch slide, and the biasing mechanism encircles the rivet and biases the latch slide against the latch receiving portion.

8. The pet kennel of claim 1, wherein
   the body includes a first body portion and a second body portion,
   the first body portion includes a first lip, and
   the second body portion includes a second lip sized and shaped to align with the first lip for attachment of the first body portion to the second body portion.

9. A method of constructing a pet kennel, the method comprising:
   providing a body having an interior space configured for a pet such that the body includes an aperture sized and shaped for the pet;
   providing a door assembly including a latching part and a hinge part, the latching part including or attached to a latching mechanism, the latching mechanism including a latch slide including a gear having first teeth, a rack lock having a lateral aperture and second teeth, and a biasing mechanism; and
   attaching the door assembly to the body such that the hinge part substantially surrounds a perimeter of the aperture and the latching part pivots with respect to the hinge part when the latching mechanism is unlocked, such that the first teeth of the gear interact with the second teeth of the rack lock to cause the rack lock to translate linearly to unlock the door assembly from the body when the latch slide is pulled from a recess against a biasing force of the biasing mechanism and rotated with respect to the recess, and such that the lateral protrusion extends from the recess into the lateral aperture.

10. The method of claim 9, wherein
    providing the door assembly includes
    fixedly attaching the latching part to a grated part, and
    pivotally attaching the latching part and the grated part to the hinge part.

11. The method of claim 9, wherein
    attaching the door assembly to the aperture of the body includes
    attaching the hinge part of the door assembly outside of the body at the aperture, and
    attaching an inner body part of the door assembly inside of the body at the aperture.

12. The method of claim 9, wherein
    providing the door assembly includes forming the latching mechanism to include the latch slide and the rack lock.

13. The method of claim 9, wherein
    providing the body includes attaching a first body portion to a second body portion to create the interior space.

14. The method of claim 13, wherein
    attaching the first body portion to the second body portion includes aligning a first lip of the first body portion with a second lip of the second body portion.

15. A pet kennel comprising:
    a first body portion including a front aperture and a first lip having first apertures; and
    a second body portion including a second lip having second apertures, the second lip sized and shaped to fit against the first lip with the second apertures aligning with the first apertures;
    a door assembly pivotally attached to the first body portion at the front aperture, the door assembly including a latching part, a grated part and a grate receiving part fixedly attached to each other so as to pivot as a single unit, the grated part located between the latching part and the grate receiving part, the latching part including a latching mechanism configured to enable locking and unlocking of the door assembly from the front aperture by sliding through lock receiving apertures in at least two of the latching part, the grated part, and the grate receiving part; and at least one attachment mechanism configured to protrude through at least one first aperture and at least one corresponding second aperture to attach the first lip to the second lip such that the first body portion and the second body portion form a body with an interior space sized and shaped for a pet between the first body portion and the second body portion, at least one of the first body portion and the second body portion including a plurality of third apertures configured to allow air to flow through the body and into the interior space.

16. The pet kennel of claim 15, wherein
the body formed by attaching the first body portion and the second body portion has a top surface, a bottom surface, a front surface and a rear surface, and the first lip and the second lip are angled downwardly from the rear surface to the front surface.

17. The pet kennel of claim 15, comprising
a sleeve including fourth apertures, the sleeve configured to cover the first lip and the second lip with the fourth apertures aligning with the first apertures and the second apertures to enable attachment of the first body portion to the second body portion via the attachment mechanism.

18. The pet kennel of claim 17, wherein
the sleeve includes fifth apertures enabling attachment of an accessory attachment, and the fifth apertures are longer than the fourth apertures in a longitudinal direction of the sleeve.

19. The pet kennel of claim 15, wherein
the latching mechanism is configured to enable locking and unlocking of the door assembly from the front aperture by sliding through lock receiving apertures in each of the latching part, the grated part, and the grate receiving part.

20. The pet kennel of claim 15, wherein
the front aperture slides through lock receiving apertures in at least the latching part and the grate receiving part.

* * * * *